US008301119B2

(12) United States Patent
Lindteigen et al.

(10) Patent No.: US 8,301,119 B2
(45) Date of Patent: *Oct. 30, 2012

(54) METHOD AND APPARATUS FOR VALIDATING INTEGRITY OF A MOBILE COMMUNICATION DEVICE

(75) Inventors: Ty Lindteigen, Phoenix, AZ (US); Franklin David Van Voorhees, Fountain Hills, AZ (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,920

(22) Filed: May 21, 2012

(65) Prior Publication Data

US 2012/0231764 A1    Sep. 13, 2012

Related U.S. Application Data

(63) Continuation of application No. 12/896,782, filed on Oct. 1, 2010, now Pat. No. 8,204,480.

(51) Int. Cl.
*H04M 1/66* (2006.01)
(52) U.S. Cl. ........................ 455/411; 713/168
(58) Field of Classification Search ............... 455/194.1, 455/221, 212; 435/29, 4, 968; 123/41.86; 348/E5.125, E5.098; 141/1, 86, 95, 59, 7
See application file for complete search history.

(56) References Cited

U.S. PATENT DOCUMENTS

| | | | |
|---|---|---|---|
| 7,483,430 B1 * | 1/2009 | Yuan et al. | 370/395.2 |
| 7,765,405 B2 | 7/2010 | Pinkerton et al. | |
| 8,204,480 B1 | 6/2012 | Lindteigen et al. | |
| 2004/0049600 A1 | 3/2004 | Boyd et al. | |
| 2004/0107358 A1 | 6/2004 | Shiakallis | |
| 2004/0268345 A1 * | 12/2004 | Lodwick et al. | 717/176 |
| 2005/0195975 A1 * | 9/2005 | Kawakita | 380/30 |
| 2007/0072599 A1 | 3/2007 | Romine et al. | |
| 2007/0150857 A1 | 6/2007 | Korkishko et al. | |
| 2007/0237145 A1 | 10/2007 | Adhikari et al. | |
| 2008/0005794 A1 | 1/2008 | Inoue et al. | |
| 2008/0313648 A1 * | 12/2008 | Wang et al. | 719/315 |
| 2009/0254572 A1 * | 10/2009 | Redlich et al. | 707/10 |
| 2010/0040067 A1 | 2/2010 | Hao et al. | |
| 2010/0174921 A1 * | 7/2010 | Abzarian et al. | 713/193 |
| 2010/0254391 A1 | 10/2010 | Kramer et al. | |
| 2011/0010543 A1 * | 1/2011 | Schmidt et al. | 713/168 |

OTHER PUBLICATIONS

General Dynamics C4 Systems. *Sectéra® Edge™ Smartphone: Secure Mobile Environment Portable Electronic Device (SME PED)*. Retrieved Oct. 1, 2010 at http://www.gdc4s.com/content/detail.cfm?item=32640fd9-0213-4330-a742-55106fbaff32.

(Continued)

*Primary Examiner* — Jean Gelin
*Assistant Examiner* — Mahendra Patel
(74) *Attorney, Agent, or Firm* — Kilpatrick Townsend & Stockton LLP

(57) ABSTRACT

A method for validating integrity of a mobile communication device includes installing an integrity verification application on the mobile communication device. The method also includes establishing a first pass indicator and a second pass indicator including receiving a first instance of the first pass indicator. The method also includes receiving a second instance of the first pass indicator as a challenge for verification. In response to receiving the second instance of the first pass indicator, the second pass indicator may be displayed as an indication of the integrity.

19 Claims, 20 Drawing Sheets

OTHER PUBLICATIONS

General Dynamics C4 Systems. Sectéra® Wireless GSM® Phone: *End-to-end Voice and Data Security for GSM Wireless Networks*, retrieved Oct. 1, 2010 at http://www.gdc4s.com/content/detail.cfm?item=97aef0a4-96e4-4ab2-b33b-eb832c4bb4c2.

General Dynamics C4 Systems. *TVE for Desktops and Laptops: Simultaneous View of Multiple Security Levels on a Single Computer*. Retrieved Oct. 1, 2010 at http://www.gdc4s.com/content/detail.cfm?item=35a995b0-b3b7-4097-9324-2c50008ba75.

Green Hills Software. Leading the Embedded World: *Integrity Secure Virtualization*, retrieved Oct. 1, 2010 at http://www.ghs.com/products/rtos/integrity_virtualization.html.

Heiser, Gernot, et al., Technology White Paper: *The Motorola Evoke QA4*, A Case Study in Mobile Virtualization, pp. 1-10, Jul. 22, 2009, Open Kernel Labs, Inc., Chicago, IL.

Hwang, Joo-Young, et al., *Xen on ARM: System Virtualization using Xen Hypervisor for ARM-based Secure Mobile Phones*, pp. 257-261, This full text paper was peer reviewed at the direction of IEEE Communications Society subject matter experts for publication in the IEEE CCNC 2008 proceedings.

L-3 communications. L-3 Guardian: *SME PED*, Business Development: Mark Alphonso, Last modified: Sep. 2, 2009, retrieved Oct. 1, 2010 at http://www.l-3com.com/cs-east/ia/smeped/ie_ia_smeped.shtml.

McAfee Mobile Security: *Keep your mobile workforce agile and portable data secure by safeguarding any data on any device* retrieved Oct. 1, 2010 at http://www.mcafee.com/us/enterprise/solutions/mobile_security/index.html.

McAfee Secure Virtualization: *Proven, comprehensive protection for both physical and virtual environments*, retrieved Oct. 1, 2010 at http://www.mcafee.com/us/enterprise/solutions/systems_protection/secure_virtualization.html.

RSA, The Security Division of EMC. Secure Virtualization and Cloud: *Build a Secure Foundation for your Virtualization Journey*, retrieved Oct. 1, 2010 at http://www.rsa.com/node/aspx?id=1212.

Non-Final office Action for U.S. Appl. No. 12/896,794 mailed on Feb. 22, 2012, 16 pages.

Summary of Examiner Interview for U.S. Appl. No. 12/896,794 mailed on Apr. 10, 2012, 4 pages.

\* cited by examiner

Fig. 3 - Smartphone (Commercial)

| Switched | Shared | Assigned Low | Assigned High |
|---|---|---|---|
| Speaker | Cell Data Network | USB | GPS |
| Microphone | WiFi Network | Bluetooth | |
| Display | Flash Storage | | |
| Keypad | Motion Gyros | | |
| Touch Screen | Digital Compass | | |
| Camera | Accelerometer | | |

Fig. 12

METHOD AND APPARATUS FOR VALIDATING INTEGRITY OF A MOBILE COMMUNICATION DEVICE

CROSS-REFERENCE TO RELATED APPLICATIONS

This application is a continuation of U.S. application Ser. No. 12/896,782, filed Oct. 1, 2010, the contents of which are incorporated herein by reference in their entirety for all purposes.

FIELD OF THE INVENTION

The present invention relates generally to mobile communication devices. More particularly, the present invention relates to methods and apparatus for providing mobile communication devices that operate in multiple isolated domains that provide differing levels of security and reliability.

BACKGROUND OF THE INVENTION

Communication systems play an important role in government, business and personal settings, each with their own unique set of requirements that sometimes overlap and sometimes conflict. In government settings, there is often a need to handle sensitive communications in a secure manner and the communication devices need to be reliable and resistant to unauthorized modification. Traditionally this is accomplished with special purpose hardware and systems that can be very expensive to develop, deploy and maintain.

In business settings, a firm or business entity may wish to provide employees with cell phones to conduct business related transactions. The business entity might prefer to separate business use of the phone from personal use for a variety of reasons. These may include the avoiding expenses incurred from personal calls, the potential embarrassment of having certain types of inappropriate personal use associated with the business entity, and the risk of downloading mal-ware that might be embedded in applications freely available on the internet.

In personal settings, users would like to enjoy the freedom to make calls and download applications of any type without restrictions, while still knowing they can rely on the phone for business use even if problems arose as a result of personal use activity.

BRIEF SUMMARY OF THE INVENTION

What is needed, therefore, is the ability to modify or otherwise use an existing commercial off-the-shelf smartphone without hardware modification in a manner that provides multiple user domains, each with differing levels of security and reliability, and wherein each domain is isolated from the other.

In embodiments of a smartphone configuration according to the present invention, a commercial off-the-shelf smartphone may be adapted through software modification techniques to provide multiple operating modes or domains that provide differing levels of security and reliability. According to one embodiment of the invention, the adaptation involves a provisioning process where previously installed software is cleared from the device and new trusted software is installed.

Each operating domain may be isolated from the others by confinement to an isolated region of memory. A communication control module enforces communication restrictions between domains by appropriately configuring a hardware memory management unit. Some domains are restricted to running applications that are signed or otherwise can only be provided from trusted sources. The communication control module may also enforce communication restrictions between software operating in the various domains and device drivers.

Techniques to detect unauthorized modification may also be provided wherein the device can verify the contents of memory through hash function calculations, cryptographic techniques and certificate challenges.

Cross domain activity notification may be provided through trusted indicators. A user operating in one domain may be notified of the arrival of email or an incoming phone call from another domain and given the opportunity to switch domains using appropriate access control methods to insure domain switching is not spoofed by unauthorized intrusion software or technique.

In accordance with an embodiment of the invention, a method for validating integrity of a mobile communication device includes installing an integrity verification application on the mobile communication device. The integrity verification application may comprise a list of expected signatures for data on the mobile communication device. The method also includes running the integrity verification application to validate the data based on the expected signatures and establishing a first pass indicator and a second pass indicator. Establishing the first pass indicator and the second pass indicator may include receiving a first instance of the first pass indicator, performing a first integrity check calculation on non-volatile memory of the mobile communication device using the first instance of the first pass indicator as a seed value to provide a first integrity check value, receiving the second pass indicator, splitting a parameter of the second pass indicator against the first integrity check value to provide a split of the second pass indicator, and storing the split of the second pass indicator in the non-volatile memory of the mobile communication device. The method also includes receiving a second instance of the first pass indicator as a challenge for verification. In response to receiving the second instance of the first pass indicator, a second integrity check calculation on the non-volatile memory of the mobile communication device may be performed using the second instance of the first pass indicator as a seed value to provide a second integrity check value, the second pass indicator may be determined based on the split of the second pass indicator and the second integrity check value, and the second pass indicator may be displayed as an indication of the integrity.

In an embodiment, the second pass indicator is displayed in response to receiving the second instance of the first pass indicator during operation or at power up of the mobile communication device.

In another embodiment, the method also includes provisioning the mobile communication device by deleting existing software from the mobile communication device and installing trusted software on the mobile communication device. The provisioning may be performed in a location that is shielded from WiFi or other remote or local access other than the provisioning.

In another embodiment, the list of expected signatures comprises binary executables.

In another embodiment, establishing the first pass indicator and the second pass indicator includes receiving a private certificate and a public certificate, encrypting the public certificate to provide an encrypted public certificate, storing the encrypted public certificate in the non-volatile memory of the mobile communication device, and encrypting the split of the second pass indicator using the private certificate before storing the split of the second pass indicator in the non-volatile memory of the mobile communication device. Determining the second pass indicator based on the split of the second pass indicator and the second integrity check value may includes decrypting the encrypted public certificate and decrypting the split of the second pass indicator using the public certificate.

In another embodiment, the first integrity check value and the second integrity check value include at least one of a hash or a digital signature.

In yet another embodiment, at least one of the first pass indicator or the second pass indicator include a text-based key phrase.

In accordance with another embodiment of the invention, a mobile communication device includes a first integrity verification application comprising a list of expected signatures for data on the mobile communication device and an initialization module configured to establish a first pass indicator and a second pass indicator. The initialization module may include an input module configured to receive the first pass indicator and the second pass indicator, a first integrity check calculation module configured to calculate a first integrity check on non-volatile memory of the mobile communication device using the first pass indicator as a seed value to provide a first integrity check value, a splitting module configured to split a parameter of the second pass indicator against the first integrity check value to provide a split of the second pass indicator, and a storing module configured to store the split of the second pass indicator in the non-volatile memory of the mobile communication device. The mobile communication device also includes a second integrity verification module configured to receive the first pass indicator as a challenge for verification. The second integrity verification module may include a second integrity check calculation module configured to calculate a second integrity check on the non-volatile memory of the mobile communication device using the first pass indicator as a seed value to provide a second integrity check value, a determining module configured to determine the second pass indicator based on the split of the second pass indicator and the second integrity check value, and a display module configured to display the second pass indicator as an indication of integrity.

In accordance with yet another embodiment of the invention, a method for validating a mobile communication device includes installing an integrity verification application on the mobile communication device. The integrity verification application may include a list of expected signatures for data on the mobile communication device. The method also includes establishing a first pass indicator and a second pass indicator. Establishing the first pass indicator and the second pass indicator may include receiving the first pass indicator, performing a first integrity check calculation on non-volatile memory of the mobile communication device using the first pass indicator as a seed value to provide a first integrity check value, receiving the second pass indicator, splitting a parameter of the second pass indicator against the first integrity check value to provide a split of the second pass indicator, and storing the split of the second pass indicator in the non-volatile memory of the mobile communication device. The method also includes receiving a second instance of the first pass indicator as a challenge for verification. In response to receiving the second instance of the first pass indicator, the method may include performing a second integrity check calculation on the non-volatile memory of the mobile communication device to provide a second integrity check value, determining the second pass indicator based on the split of the second pass indicator and the second integrity check value, and displaying the second pass indicator as an indication of integrity.

Other objects, features, and advantages of the present invention will become apparent upon consideration of the following detailed description and the accompanying drawings

BRIEF DESCRIPTION OF THE DRAWINGS

FIG. 12 is a table listing categories of device drivers in accordance with an embodiment of the invention.

DETAILED DESCRIPTION OF THE INVENTION

As described herein, a goal of a multiple domain smartphone is to provide different levels of security and stability in different domains depending on the usage context and to provide an efficient and convenient way to switch between the domains without sacrificing security and stability. A further goal is to provide this capability using a commercial off-the-shelf (COTS) smartphone with only software modifications. The software modifications are intended to provide "secure" software, by which is meant that the quality and integrity of the of the software and its execution environment may provide a basis for trusting its behavior.

A multiple domain smartphone according to embodiments described herein provides many benefits. It should be understood that a viable system need not include all of the features described herein and is susceptible to various modifications and alternative forms.

Figure 1:
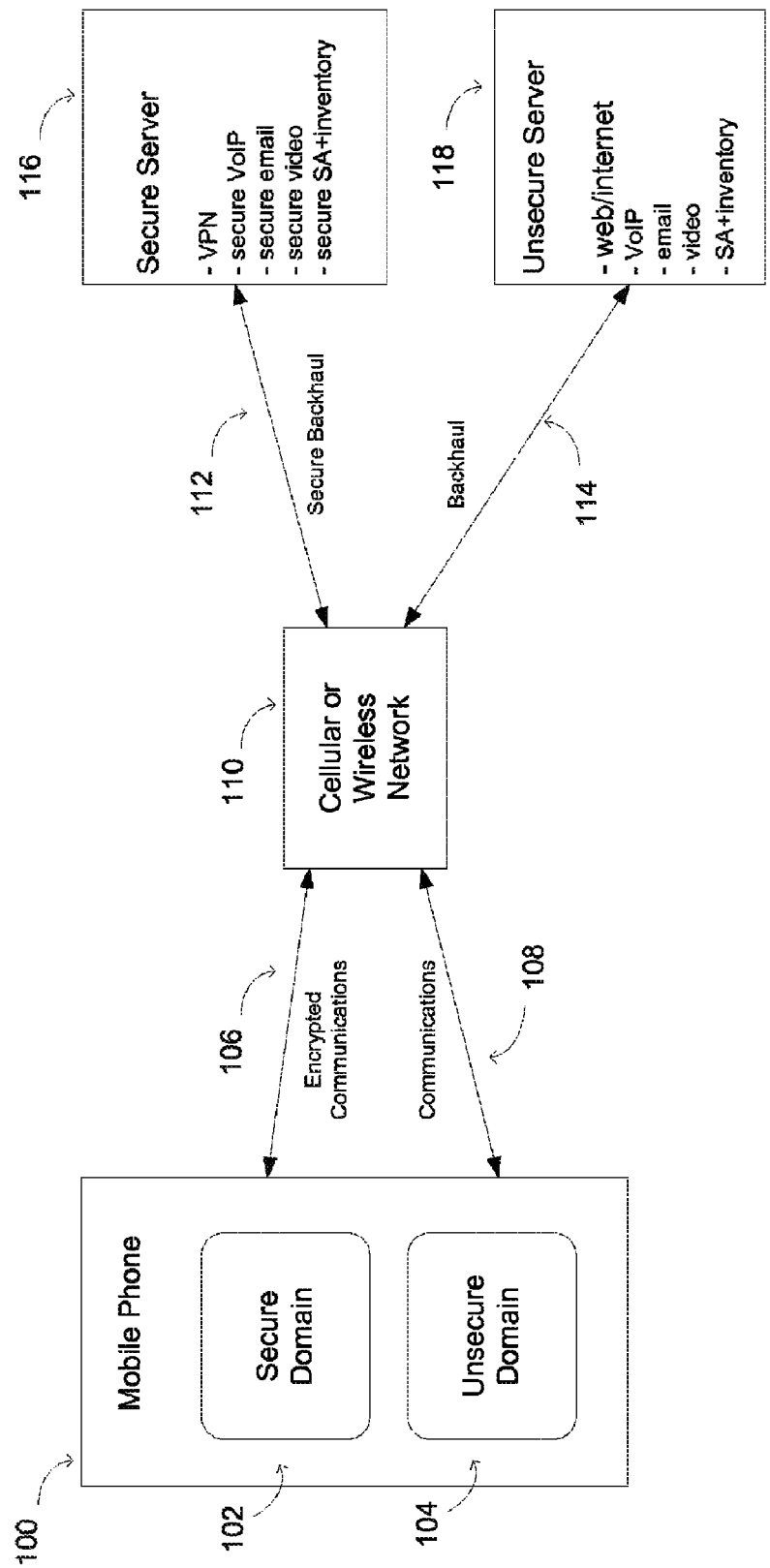
FIG. 1 is a block diagram illustrating a smartphone used in a government application.

One embodiment of the invention is described with reference to FIG. 1, which shows a simplified diagram of a secure smartphone in a government application. In FIG. 1, a mobile phone 100 may be operated in a secure domain 102 or an unsecure domain 104. The mobile phone 100 may be, for example, an Android™ smartphone or any suitable commercially available smartphone. In secure domain 102, communications 106 between mobile phone 100 and Cellular or Wireless Network 110 may be encrypted. In unsecure domain 104, communications 108 between mobile phone 100 and Cellular or Wireless Network 110 may be open. Cellular or Wireless Network 110 may then communicate to either a secure server 116 over a secure backhaul 112 or to an unsecure server 118 over an open backhaul 114.

Secure server 116 may provide services including Virtual Private Network (VPN), secure Voice over IP (VoIP), secure email, secure video and secure Situational Awareness and inventory.

Unsecure server 118 may provide services including web/internet access, VoIP, email, video and Situational Awareness and inventory.

Figure 2:
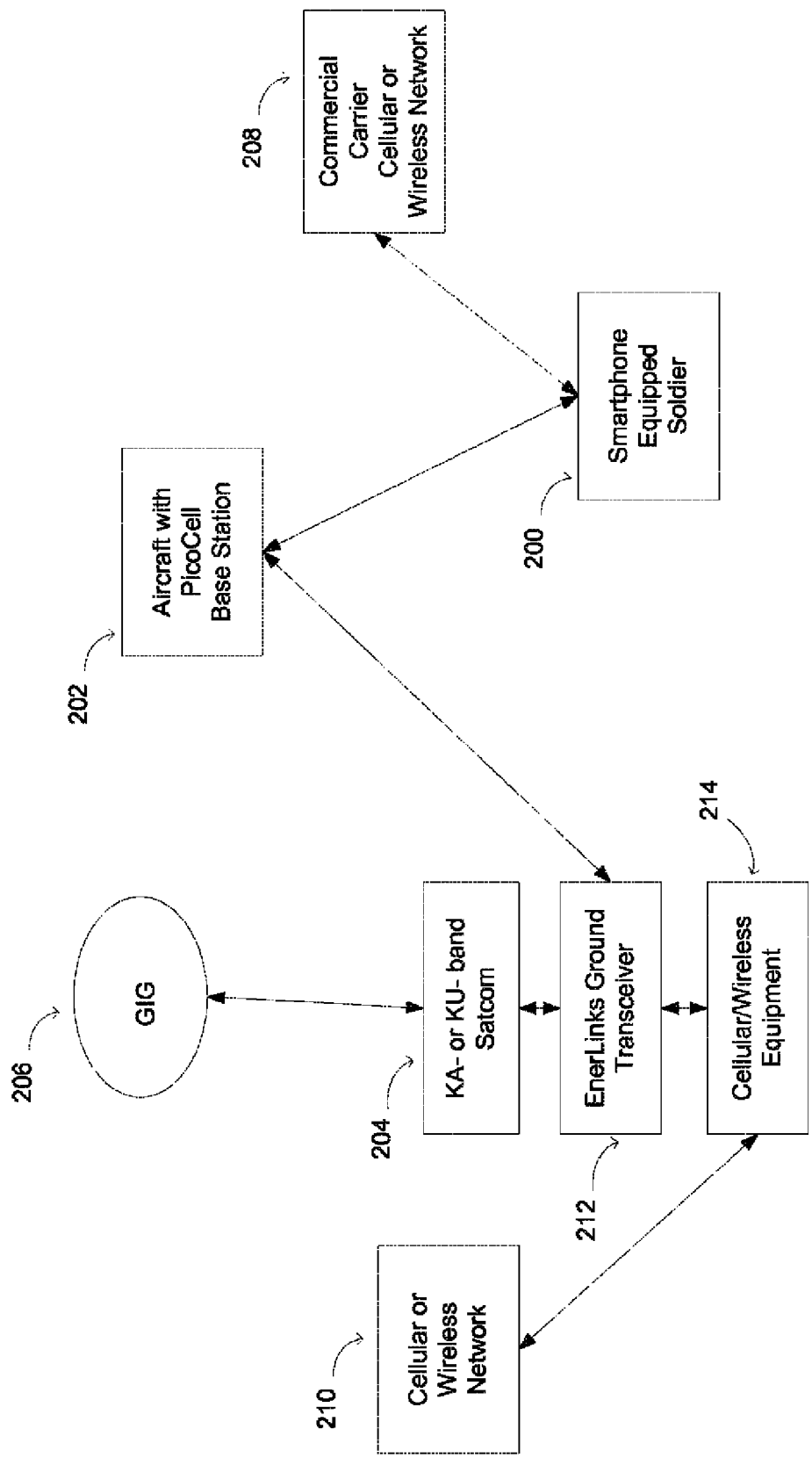
FIG. 2 is a block diagram illustrating a smartphone fielded in a government application.

FIG. 2 illustrates a real world application of the secure smartphone as it may be used on a battlefield. Smartphone equipped soldiers 200 may communicate in a secure domain to a manned or unmanned aircraft equipped with a picocell base station 202 which may then relay the communication to a Ka-band or Ku-band satellite communications unit 204 through an EnerLinks™ ground transceiver 212. The satellite communications unit 204 then relays the communications to a global information grid (GIG) 206. Alternatively, the EnerLinks™ ground transceiver 212 could relay the communication to cellular/wireless equipment 214 which may then relay the communication to a cellular or wireless network 210. The smartphone equipped soldiers 200 may also switch to an unsecure domain to communicate through a cellular or wireless network 208 operated by a commercial carrier in a nearby town. Use of a smartphone in this manner may provide greater network throughput at a fraction of the cost of traditional tactical radios.

Figure 3:
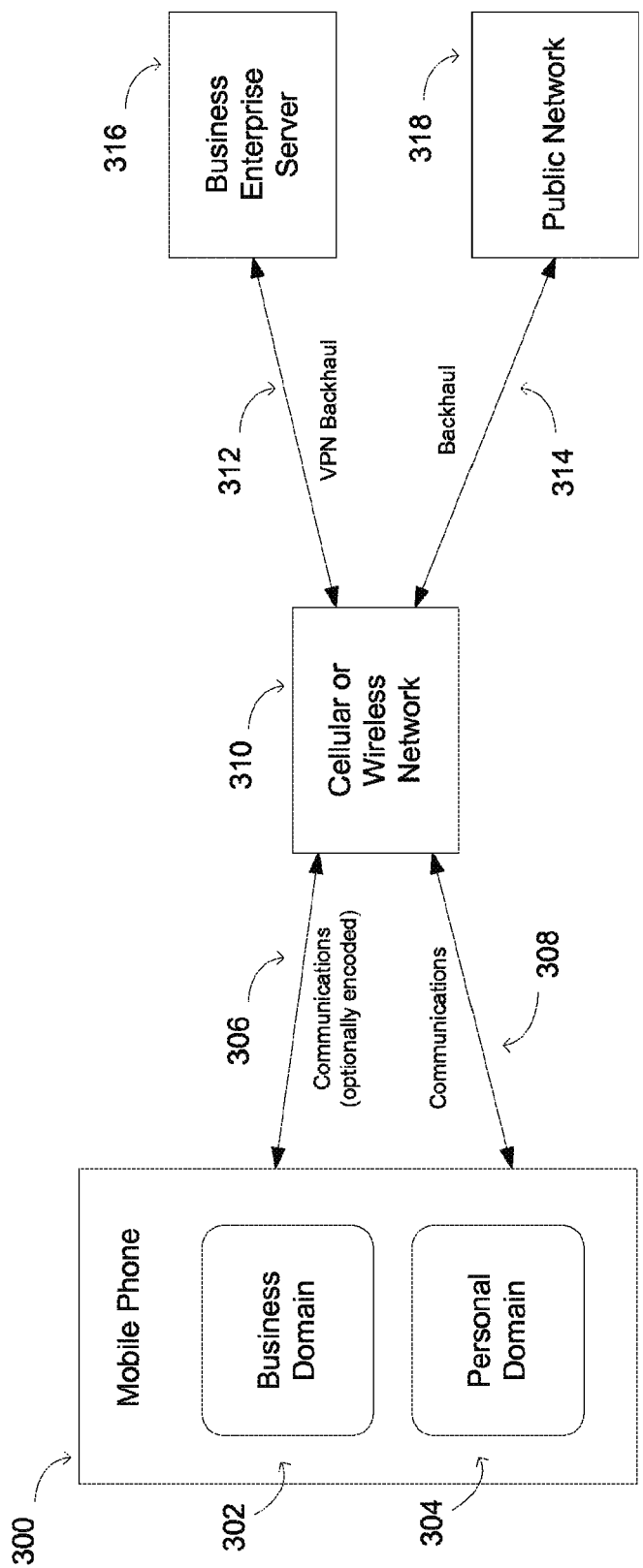
FIG. 3 is a block diagram illustrating a smartphone used in a commercial application.

An alternative embodiment of the invention is described with reference to FIG. 3, which shows a simplified diagram of a multi-domain smartphone in a commercial application. In FIG. 3, a mobile phone 300 may be operated in a business domain 302 or a personal domain 304. In business domain 302, communications 306 between mobile phone 300 and cellular or wireless network 310 may optionally be encoded. In personal domain 304, communications 308 between mobile phone 300 and cellular or wireless network 310 may be open. Cellular or wireless network 310 may then communicate to either a business enterprise server 316 associated with the business domain over a VPN backhaul 312 or to a public network 318 over an open backhaul 314.

Figure 11:
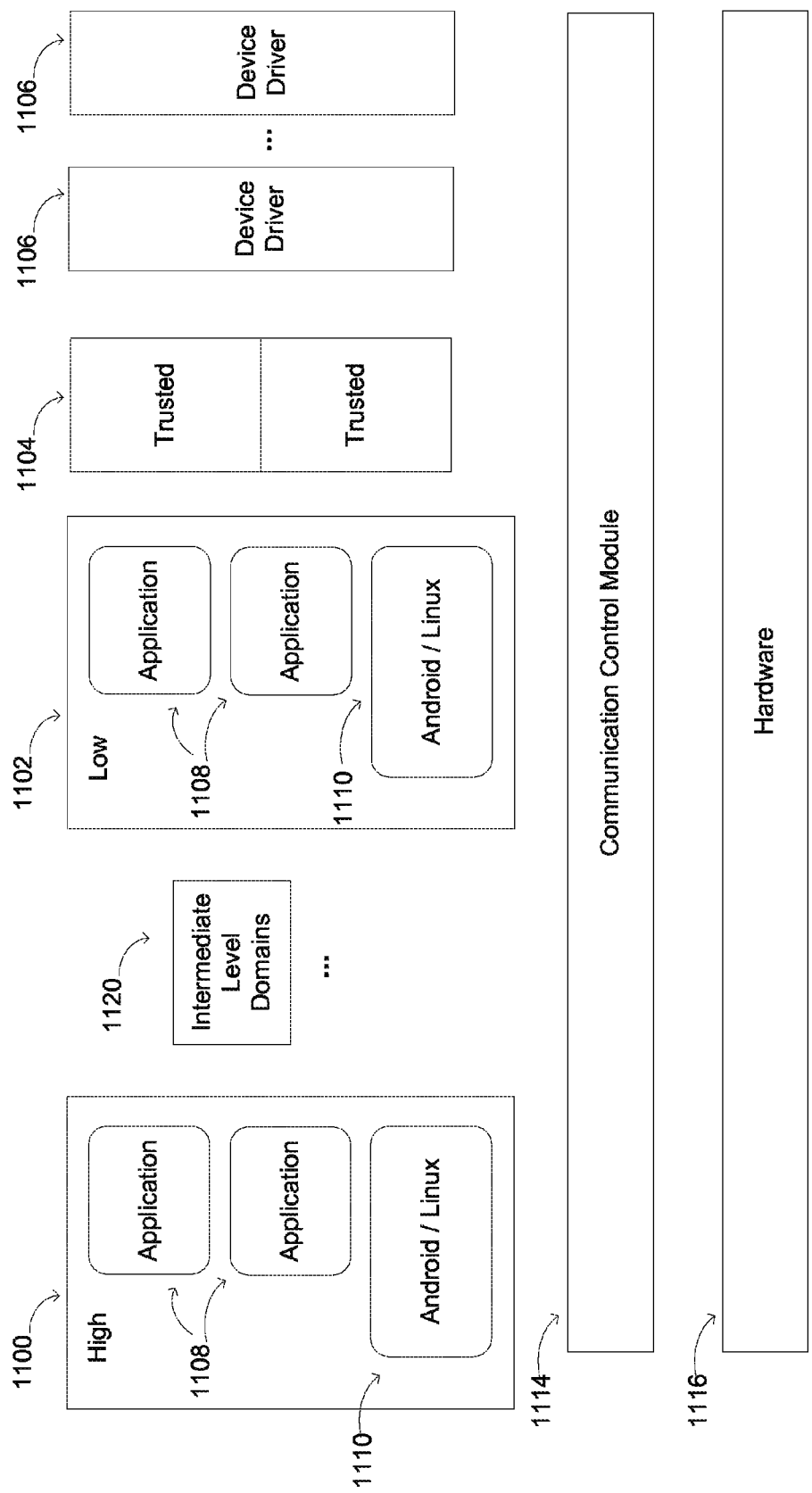
FIG. 11 is a block diagram illustrating isolated domains within a smartphone in accordance with an embodiment of the invention.

FIG. 11 illustrates a basic block diagram of the smartphone in accordance with an embodiment of the invention which will be discussed in greater detail later in the detailed description. As an introduction for the discussion that follow, the device comprises multiple isolated domains 1100, 1102, 1104 1106 and hardware 1116 which may further comprise a processing module to run operating systems 1110 and application software 1108. Each operating system 1110 may be dedicated to an operating domain such as the high domain 1100, the low domain 1102, or any number of intermediate level domains 1120. The high domain 1100 may run secure or business applications while the low domain 1102 may run unsecure or personal applications. The device also comprises a communication control module 1114 to enforce communication restrictions between each of the operating systems 1110, device drivers 1106, trusted applications 1104 and device hardware 1116. FIG. 11 presents an overview of the system and the interconnected components, each of which will be described in fuller detail below.

Provisioning

Figure 4:
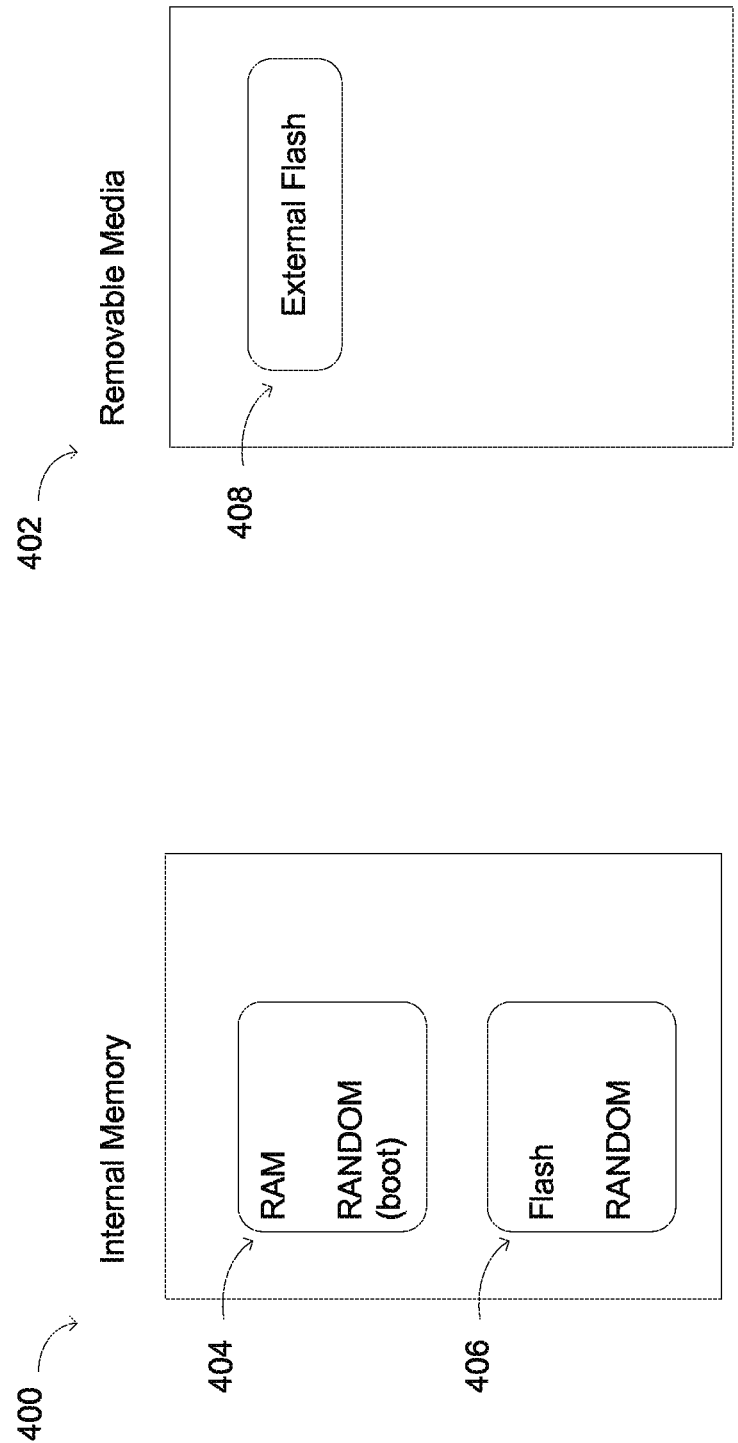
FIG. 4 is a block diagram illustrating an exemplary embodiment of the memory components of a smartphone.
Figure 5:
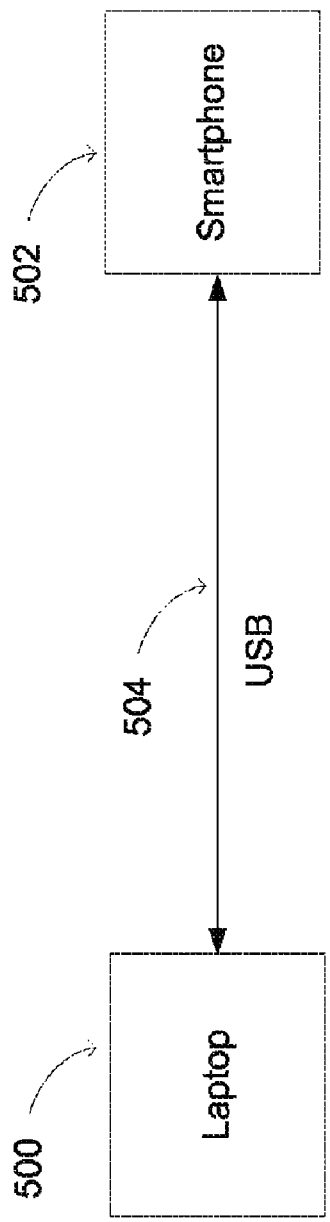
FIG. 5 illustrates a smartphone connected to a laptop computer.

Before any security measures may be effective, a newly purchased commercial phone is wiped clean and re-imaged with a secure software image. A smartphone may be provisioned by obtaining a commercially available off-the-shelf phone and performing a sequence of steps to be described. A goal of the provisioning process is to ensure that the phone is cleared of any pre-existing data and software prior to installing new applications. First, the phone may be isolated by shielding it from open WiFi access to prevent unauthorized wireless access or interference. Next, the external Flash card and SIM card, which contain cellular data network information as illustrated in FIG. 4 at 402, may be removed. An unsigned application may then be download, installed and run on the phone to overwrite and replace the boot area of the RAM memory 404. At this point Flash memory is corrupted and normal phone operations will no longer work. This may be verified later. The phone may now be rebooted with new boot code. A series of non-compressible random numbers may be downloaded over a USB port to fill all memory, such as RAM and Flash, as illustrated in FIG. 5. A hash calculation, based on a seed value, of all the random data written to memory may then be performed. If the resulting hash value matches an expected value then the phone has been verified to be clear of any previous data or software. A secure Flash image may then be downloaded and the phone rebooted, at which point the secure image takes control of the phone. If the hash value did not match, then something prevented the replacement boot software from executing and the unit can not be secured.

Detection of Unauthorized Modification

Figure 6:
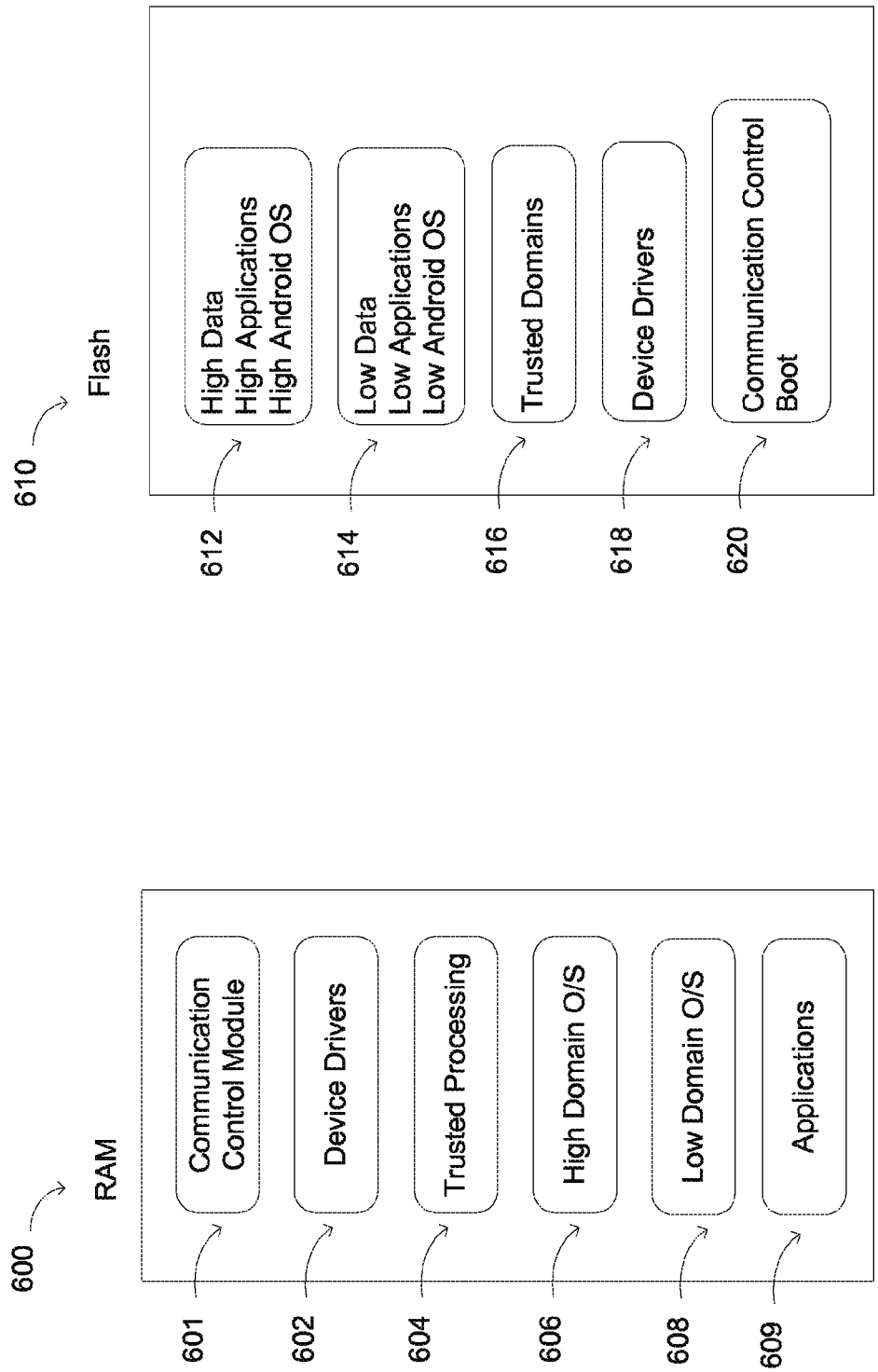
FIG. 6 illustrates an exemplary embodiment of a memory layout for a smartphone.

It may be useful to ensure that the phone has not been subject to unauthorized modification during the course of its operation or between times of usage. Although some commercial phones have varying levels of protection against this, there is no phone that cannot have its software image at least partially modified. While it may not be possible to prevent unauthorized modification without the use of custom hardware or mechanical housing, it is possible to make the process difficult and detectable. Techniques for detection of unauthorized modification may be combined with an appropriate physical possession policy to minimize the possibility of unauthorized modification. Any unauthorized modification to the contents of memory are cause for concern. FIG. 6 illustrates an example embodiment of a memory layout for the smartphone which may be useful for the discussions that follow. RAM 600 may contain communication control module 601, a device driver region 602, a trusted software region 604, a high domain O/S region 606, a low domain O/S region 608 and application region 609. Flash 610, which is non-volatile memory, may contain high domain 612 data, applications and operating system (such as an Android™ OS). Flash 610 may also contain low domain 614 data, applications and operating system (such as an Android™ OS). Flash 610 may also contain trusted domains 616, device drivers 618 and a communication control boot 620.

In one embodiment of the invention, detection of unauthorized modification may be achieved through an on-demand random challenge involving only the phone after the phone has been put into a known state via the provisioning process. In this technique, a first text-based key phrase may be entered and used as a hash seed value. The phone then performs a hash calculation over the Flash memory including the boot, trusted domains, device drivers and all operating systems. A second text-based key phrase may then be entered and split against the hash result. The split is stored in Flash memory while the second key phrase is erased from memory. Whenever the integrity of the phone needs to be verified, the first key phrase may be entered and in response, the phone calculates and displays the second key phrase based on the contents of the Flash memory. If the displayed second key phrase is the expected value then the Flash memory is unlikely to have been modified.

In another embodiment of the invention, detection of unauthorized modification may be achieved through an on-demand random challenge involving the phone and a laptop or other computer that has a copy of the original Flash image in the phone. In this technique, the laptop may request a copy of the data portion of the Flash memory for temporary safekeeping and replace those portions with random values from the laptop. The laptop may then provide a seed and request an on-demand random challenge as described in the previous technique. The laptop may then verify the results of this challenge, which the phone computes based on the random data that was just downloaded, to ensure that the challenge process has not been corrupted. If the expected hash value is produced from the challenge then there is some assurance that the phone software has not been corrupted and the laptop may then restore the data portions of Flash with the original contents that were saved.

In another embodiment of the invention, detection of unauthorized modification may be achieved through the installation of a host based integrity verification application on the phone. There may be separate integrity verification applications for each domain. The integrity verification application may be downloaded and installed through the wireless network (i.e., "over the air") or through a USB port. The integrity verification application may be signed to indicate that it comes from a trusted source or has otherwise been evaluated and approved. Thus, the integrity verification is done by means of trusted processing. The integrity verification application contains a database of expected signatures for key binary executables that may be run on the phone, as well as other specific data, and verifies the signature of each binary executable against the appropriate entry in the list of expected signatures. The list of expected signatures is itself also protected from external modification and subject to integrity checks. The integrity verification application may be run to produce an overall pass or fail indication, wherein the failure to match any signature against the corresponding expected signature would result in an overall fail indication.

In another embodiment of the invention, detection of unauthorized modification may be achieved through an on-demand certificate challenge to cryptographically detect changes in persistent memory involving only the phone and two key phrases for verification. This technique may consist of an initialization phase and a verification phase.

Figure 7:
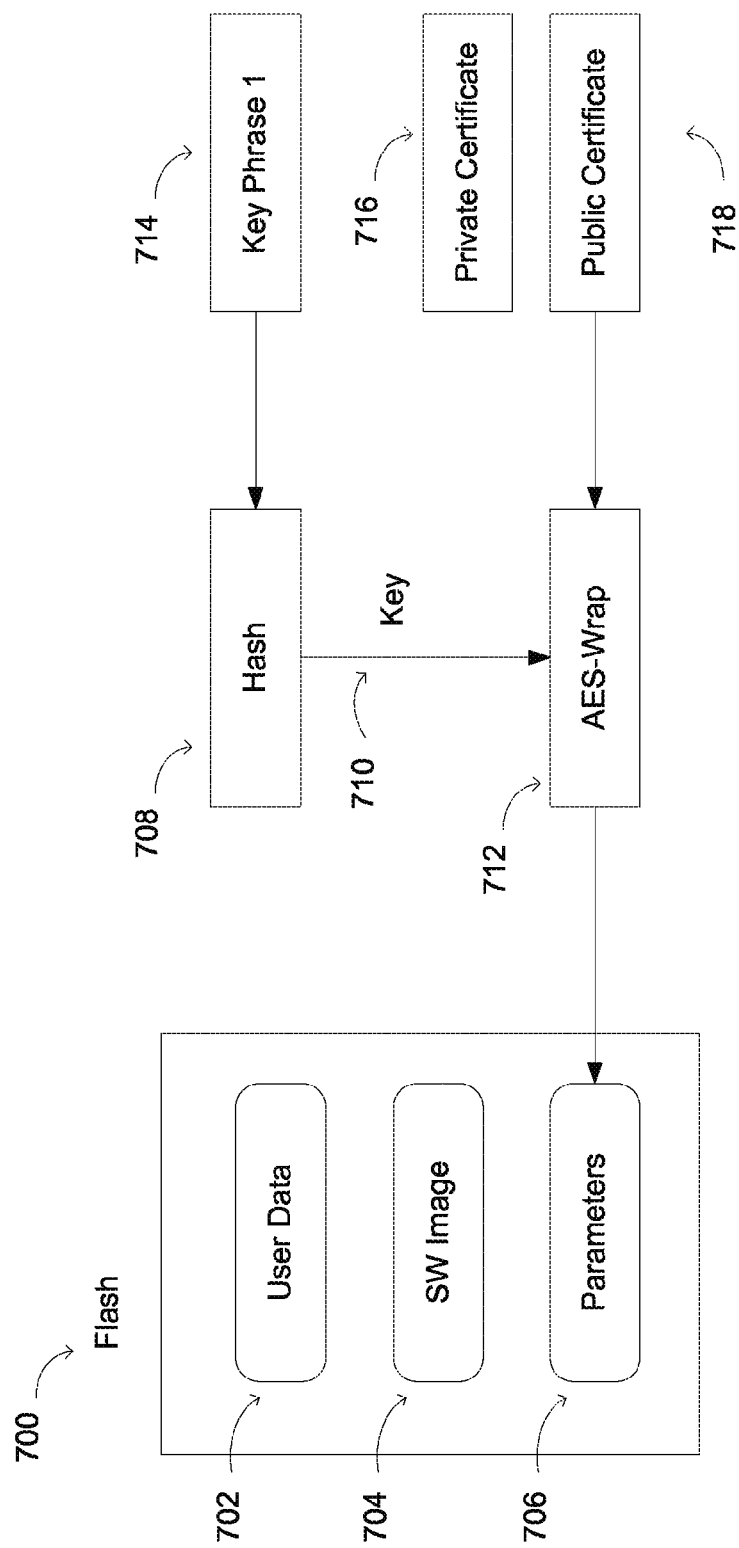
FIG. 7 is a block diagram illustrating the first part of an initialization phase for detection of unauthorized modification in accordance with an embodiment of the invention.
Figure 8:
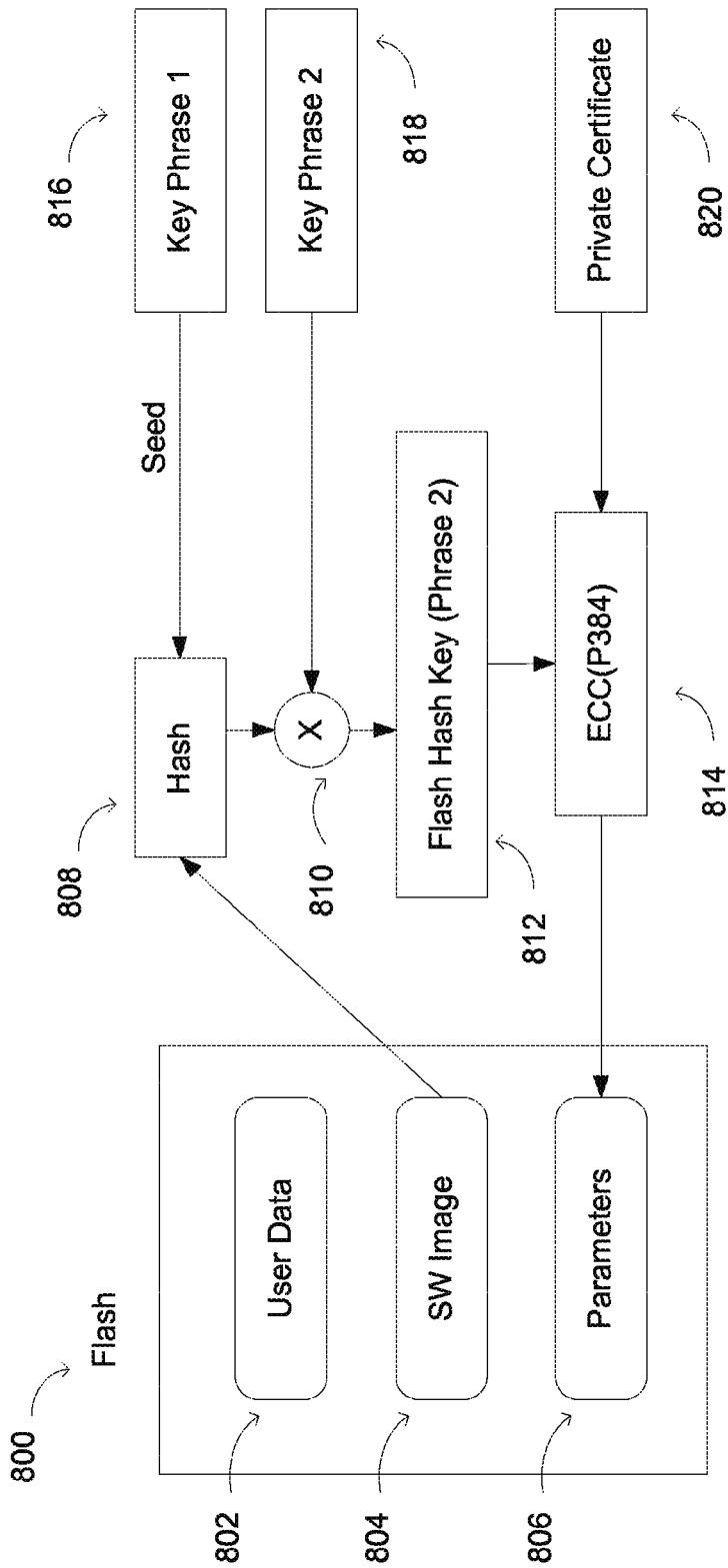
FIG. 8 is a block diagram illustrating the second part of an initialization phase for detection of unauthorized modification in accordance with an embodiment of the invention.

The initialization phase is illustrated in FIGS. 7 and 8. After the phone has been provisioned and is in a known state, private 716 and public 718 certificates may be obtained which are unique to the phone. A first text-based key phrase 714 is entered and a hash function 708 is calculated. The public certificate 718 is then AES encrypted 712 using the hash of the first key phrase 710. This encrypted public certificate is then stored in persistent memory 706.

Moving now to FIG. 8, using the first key phrase 816 as a seed, a hash function is calculated 808 over the software image 804 in Flash memory 800. The software image 804 includes the boot, trusted domains, device drivers and operating systems but excludes user data and applications. A second text-based key phrase 818 is entered and split against the Flash hash word at 810 to create a Flash hash key 812. The Flash hash key 812 is then encrypted at 814 using the private certificate 820 and stored in persistent memory 806. The private certificate 820 and the second key phrase 818 are then cleared from the phone.

Figure 9:
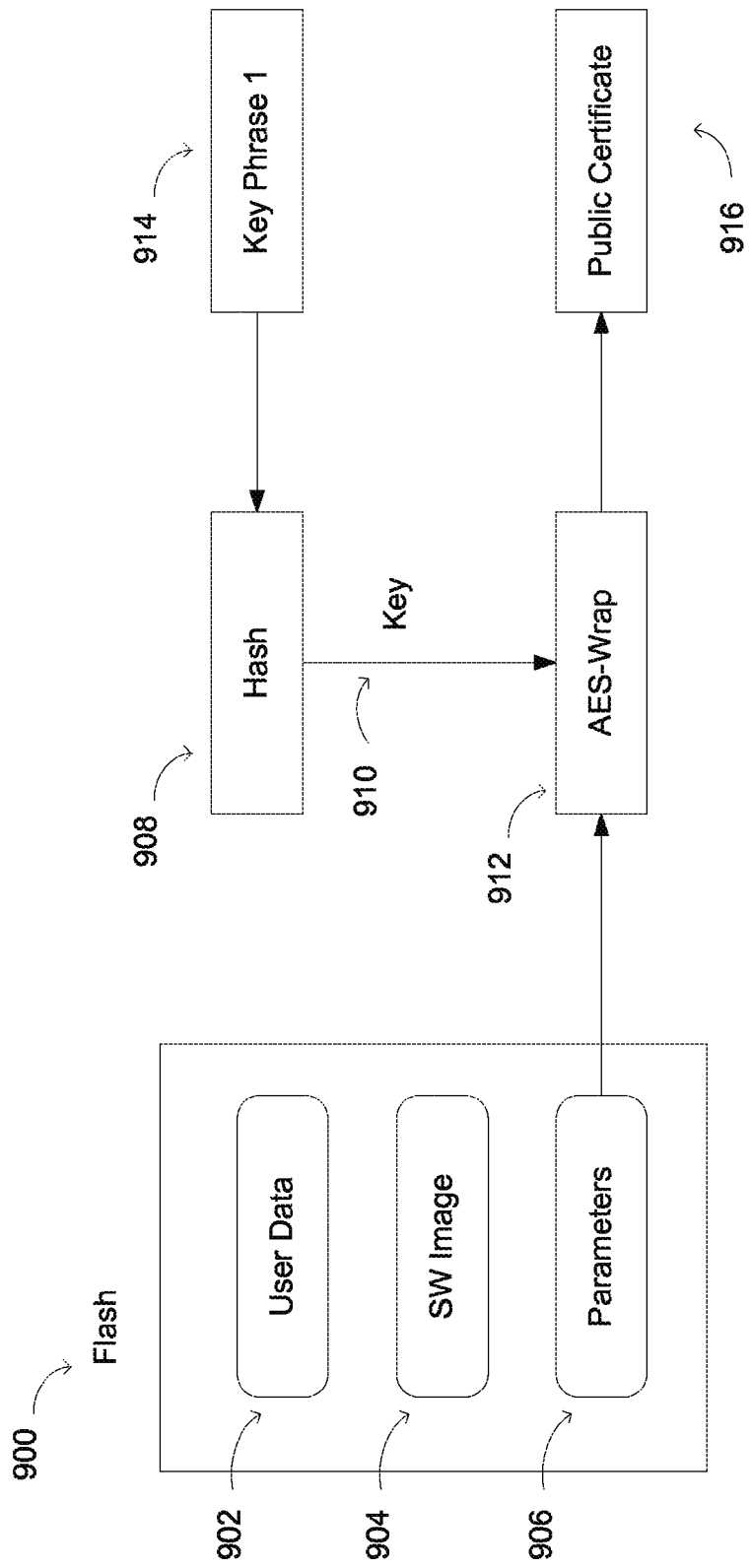
FIG. 9 is a block diagram illustrating the first part of a verification phase for detection of unauthorized modification in accordance with an embodiment of the invention.
Figure 10:
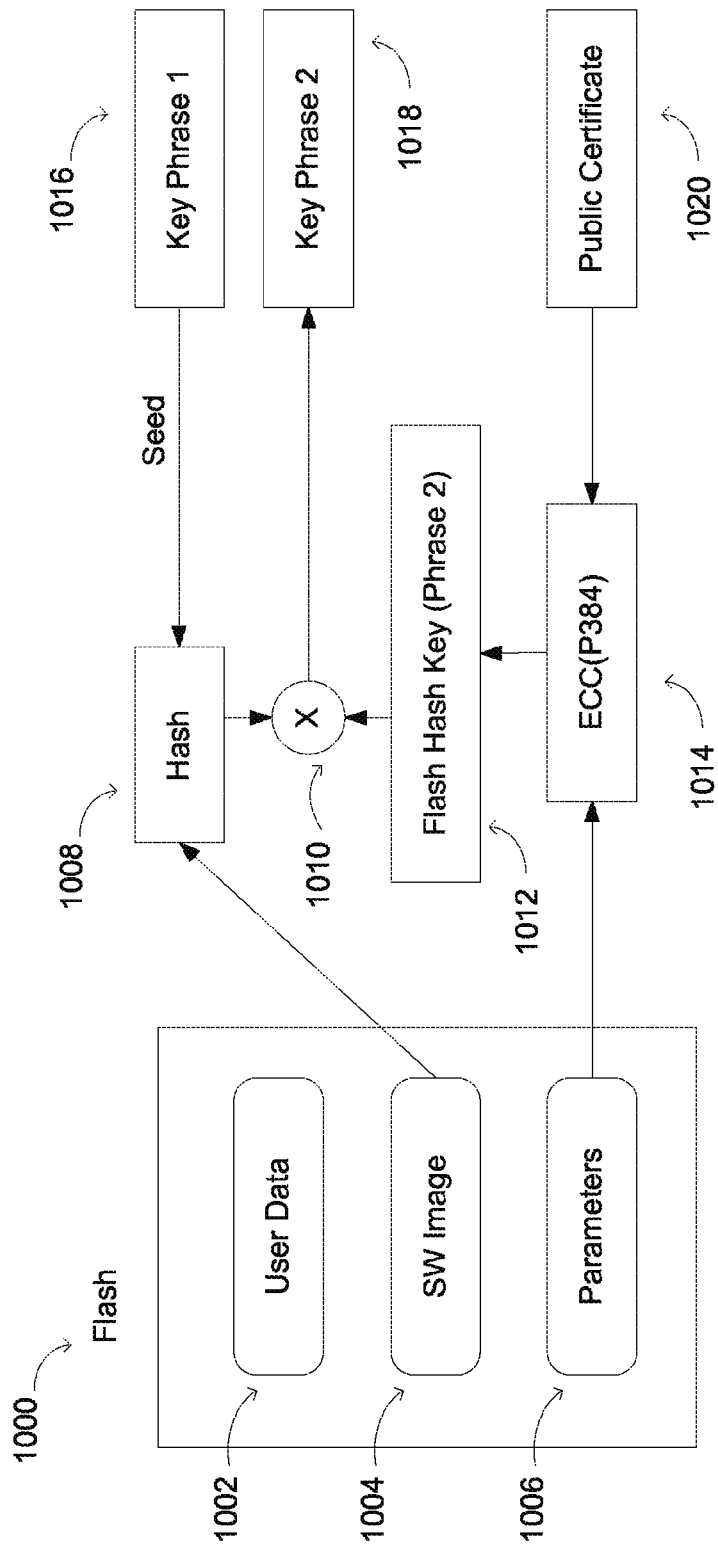
FIG. 10 is a block diagram illustrating the second part of a verification phase for detection of unauthorized modification in accordance with an embodiment of the invention.

The verification phase is illustrated in figures FIGS. 9 and 10. The user may initiate a certificate challenge by entering the first key phrase 914. A hash of the first key phrase 910 is then used as an AES key to unwrap, at 912, the encrypted public certificate stored in persistent memory 906, to reproduce the public certificate 916.

Moving now to FIG. 10, the public certificate 1020 is used to decrypt, at 1014, the Flash hash key 1012. The first key phrase 1016 is also used as a hash seed to calculate a hash 1008 over the software image 1004 in Flash memory 1000. The hash value is combined with the Flash hash key at 1010 to recover the second key phrase 1018. If the recovered second key phrase 1018 matches the expected value then the integrity of the software image 1004 has been verified.

Secure Initial State

Prior to being used for secure operations, the health of the platform may be determined and all elements of the system placed into a known state. At power up, health tests may be performed for both the hardware and the Flash memory, including software and persistent data. Power up health tests focus on establishing that the hardware environment is sound, including CPU, RAM and Flash memory, and that the software and data contents of the Flash memory are valid and authenticated. The tests may involve the CPU instruction set; CPU registers; MMU; RAM storage, address and data lines; and Flash address and data lines.

In addition to power up health tests, operational health tests may monitor the health of the hardware environment while the device is operational. These may be periodically performed in the background with minimal impact to the user functionality. These tests may involve the CPU instruction set; CPU registers; MMU; RAM storage and data lines; and before-use Flash program cyclic redundancy check (CRC).

Additionally, the identity of the user may be authenticated through a password challenge at power up, prior to entering into the operational environment. After authentication the system may be initialized by loading the communication control module, the operating system environments and trusted software.

Isolated Regions of Memory

Four isolated domains, or regions of memory, may be provided as illustrated in FIG. 11. A system high domain 1100 may provide applications 1108 and an operating system 1110, such as the Android™ or Linux™ operating system. A system low domain 1102 may provide applications 1108 and an operating system 1110, such as the Android™ or Linux™ operating system. The system low domain may be used for unclassified processing. Although only one high domain 1100 and one low domain 1102 are illustrated for simplicity, and number of each type of domain may be provided. Any number of additional intermediate level domains 1120 may also be provided. Trusted domains 1104 may be used for secure transforms, cryptographic control, security configuration, access control and secure switching and other security related software. Domains 1106 may be used for device drivers. Each domain operates as an independent virtual machine (VM). Separation is enforced between domains by a memory management unit (MMU), which is part of the phone hardware 1116, and a communication control module 1114 which configures the MMU.

The communication control module is similar to an operating system kernel except that it may only perform the tasks necessary for configuring memory separation, and inter-domain communications. This may include an application scheduler and moving data between address spaces (isolated domains or memory regions). This allows device drivers and operating systems to exist entirely in their own address space. The separation of all tasks across all operating systems present on the same processor is maintained by the communication control module.

The system high 1100 and system low 1102 domains may be complete and isolated operating systems with their own set of applications and storage. Although only one of each is shown in FIG. 11 for simplicity, there may be as many as required. Similarly, although two trusted domains 1104 are shown, there may be as many as required including redundant trusted domains.

Each domain in FIG. 11 exists as a separate Cell under the communication control module. A Cell consists of resources isolated and protected from other cells, including an address space in memory enforced by the MMU, as well as execution time on the CPU enforced by time-slicing. The protection of all cells is managed by the communication control module. The communication control module configures the MMU each time it switches focus to a new domain, allowing it access to its own resources and only those resources. The communication control module also replaces the portions of the OS in each domain, such that their schedulers may now rely on the communication control module for configuring the MMU for their sub-tasks.

Device Drivers

A goal of some embodiments of the invention is to allow the device drivers to be portable. Existing device driver binaries may be used in unmodified form. This is possible because they are wrapped with functional translation between the OS and the communication control module and because they are isolated in their own domain. Some device drivers may be wrapped with trusted software to enable switching or transformations. This may offer the advantage of allowing for rapid migration as new releases are made available. Device drivers may change implementation significantly with hardware, but the fundamental device driver interface changes infrequently.

There may be four classes of device drivers as illustrated in the table of FIG. 12. These class are switched, shared, assigned low and assigned high. Specific example of actual device drivers are provided within each class.

Figure 13:
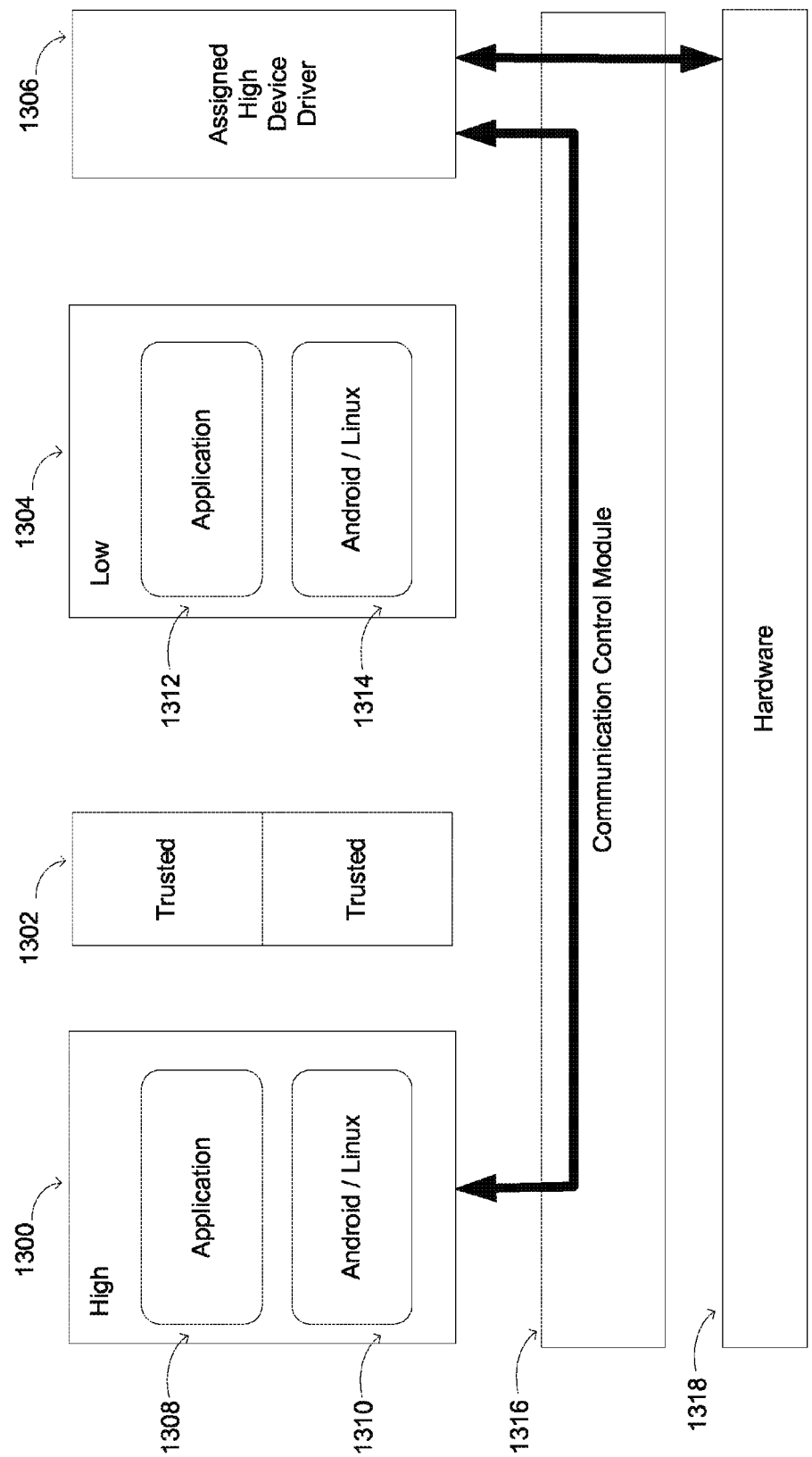
FIG. 13 is a block diagram illustrating communication with "assigned high" device drivers in accordance with an embodiment of the invention.

As illustrated in FIG. 13, physical devices assigned exclusively to the system high domain 1306 may be available only to the system high domain 1300. The data that passes through these devices may not undergo an encryption transformation. The GPS device provides precise location information about the user. In some situations it may be preferable to keep this information secret and not shared over clear channels which is why the GPS device driver may be assigned to the high domain. Device drivers in the assigned high domain may be fixed in the software image. In alternate embodiments, the assignment may be configurable by an authorized entity. Such assignment reconfiguration may require a reboot of the phone.

Figure 14:
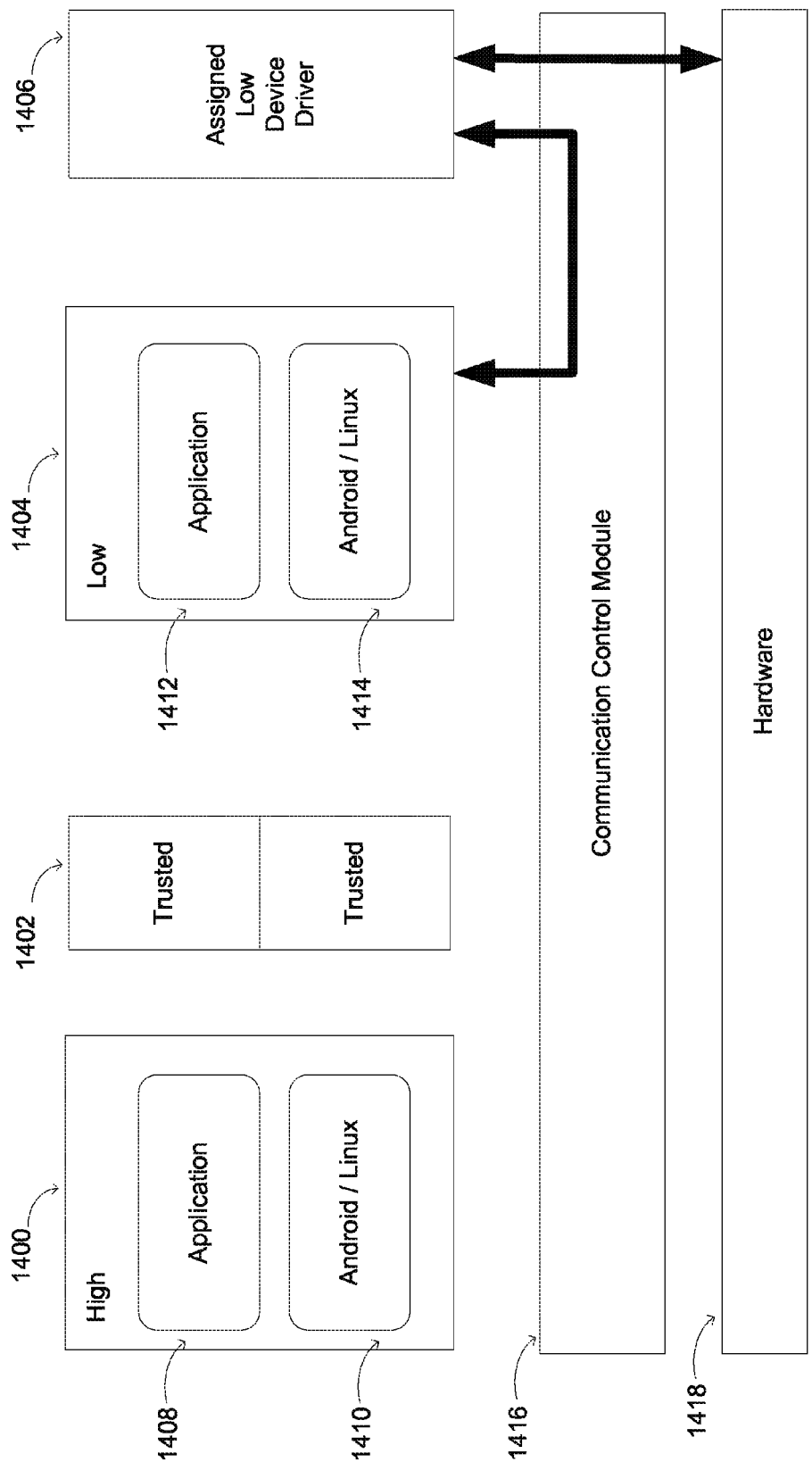
FIG. 14 is a block diagram illustrating communication with "assigned low" device drivers in accordance with an embodiment of the invention.

As illustrated in FIG. 14, physical devices assigned exclusively to the system low domain 1406 may be available only to the system low domain 1400. The data that passes through these devices typically need not undergo an encryption transformation, although in some embodiments they may undergo such a transformation if required. Devices such as the USB bus and Bluetooth need to be compatible with their existing protocol specification which may make it impractical to transform or share their data passing through the bus. Device drivers in the assigned low domain may be fixed in the software image. In alternate embodiments, the assignment may be configurable by an authorized entity. Such assignment reconfiguration may require a reboot of the phone.

Figure 15:
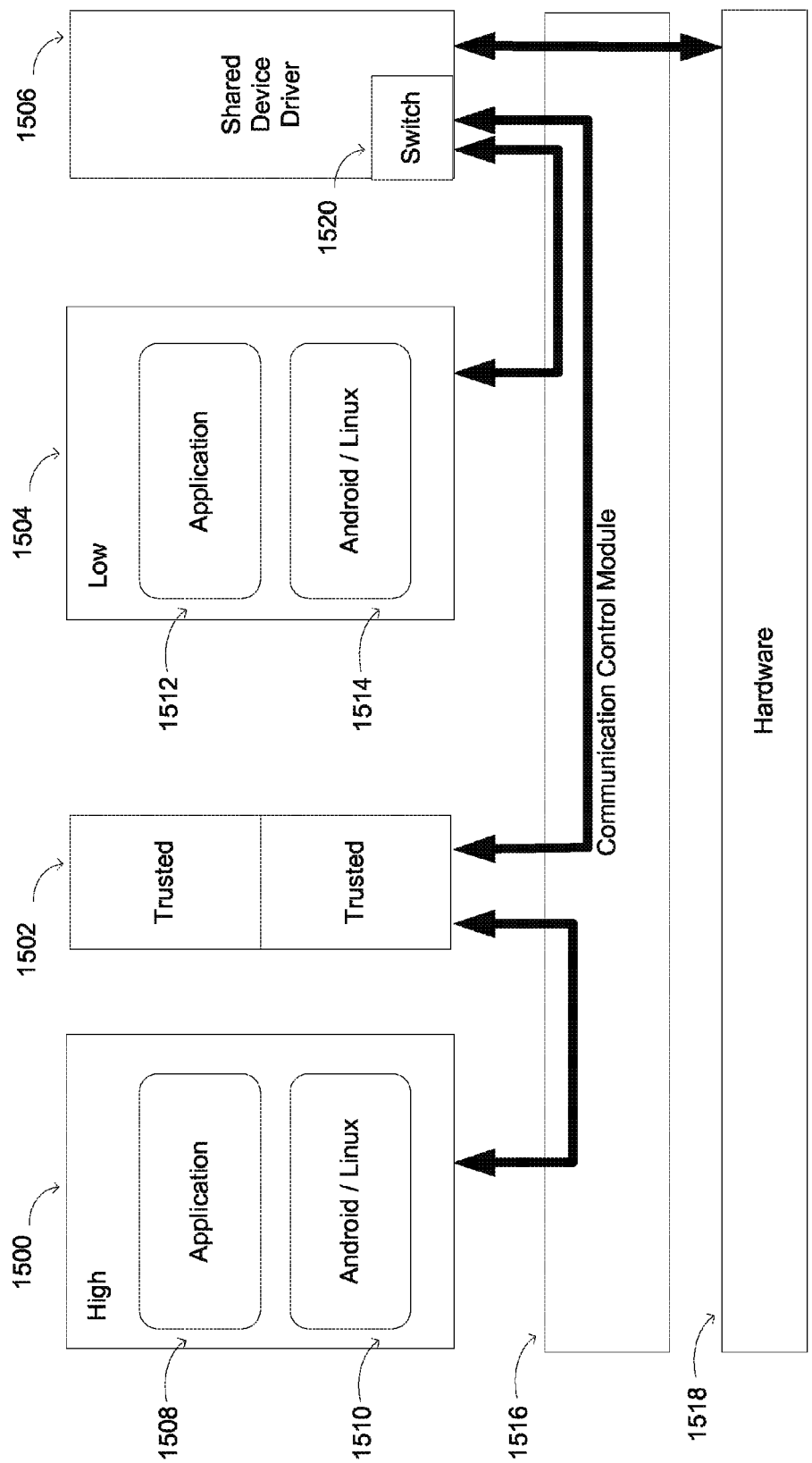
FIG. 15 is a block diagram illustrating communication with "shared" device drivers in accordance with an embodiment of the invention.

As illustrated in FIG. 15, shared devices 1506 may always be available to both high and low domains 1500 and 1504. The data that passes through these devices is encrypted data compatible with the system low domain.

The cellular data network and WiFi network are packet-switched IP networks. Packets exiting from the system high-side are first subject to an Internet Protocol Security (IPSec) transformation in a trusted domain before reaching the device driver. Packets entering and exiting the system low-side are unchanged. By sharing the device data services each domain can access the network when needed, allowing for background syncing and avoiding connection loss from network timeouts regardless of which domain is currently selected by the user. This may also allow the domain with which the user is not interacting to enter an idle, low power state, increasing battery life. This may also avoid additional latency that would otherwise be created by routing data from the system high-domain to the trusted domain to the system low-domain and then to the device driver.

The Flash storage device may be partitioned between the high domain and the low domain, allowing each access only to their own data. Data transfer from either side goes through an encryption transformation in a trusted space with each domain using a different symmetric encryption key.

Figure 16:
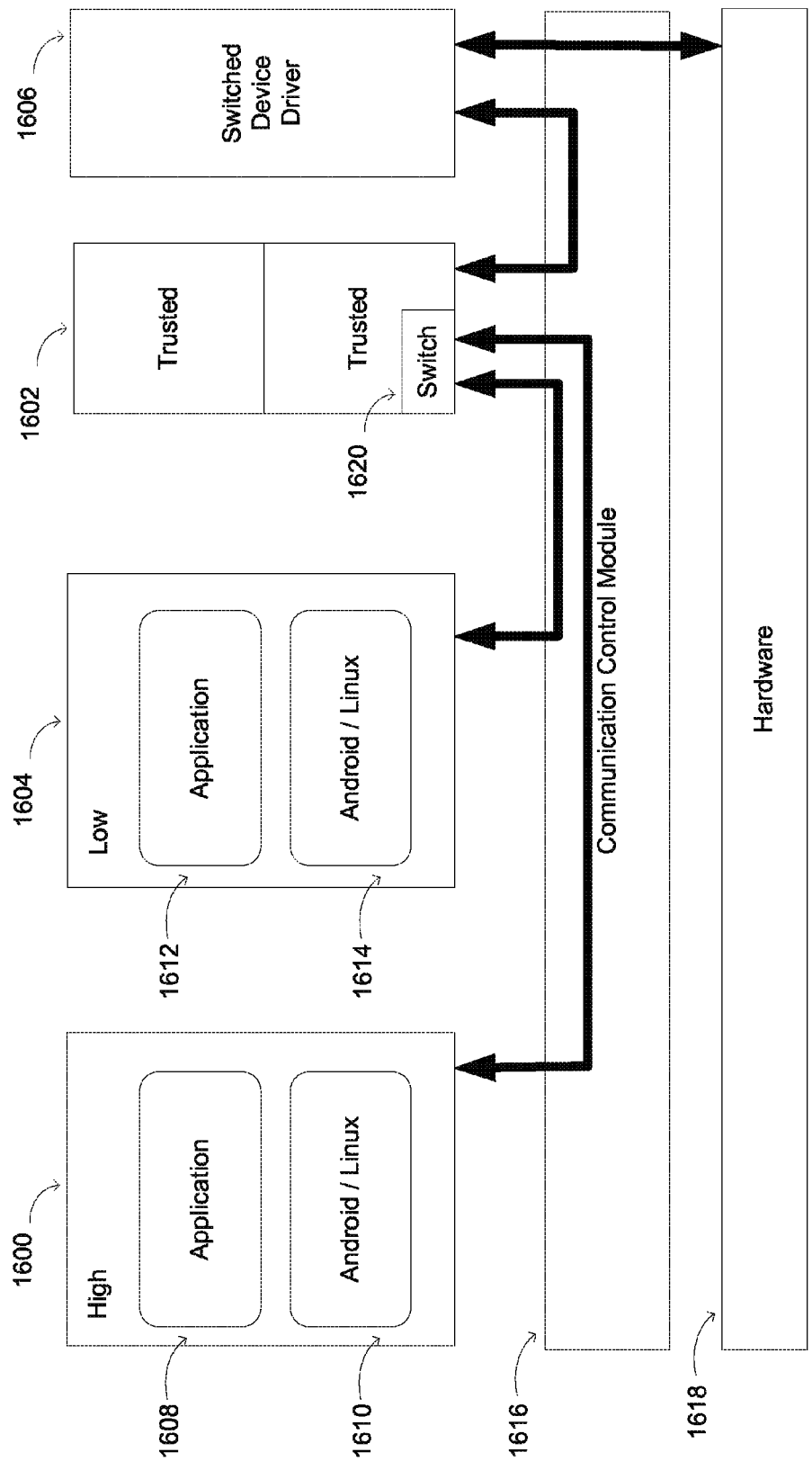
FIG. 16 is a block diagram illustrating communication with "switched" device drivers in accordance with an embodiment of the invention.

As illustrated in FIG. 16, switched devices 1606 change exclusive assignment between high and low domain 1600 and 1604 while assigned. The data that passes through these devices may not usually be encrypted. There may be an effective sanitization strategy for output devices before each switch 1620. Input devices may not need sanitization. The display and speaker are two examples of switched output devices. The sanitization consists of flushing and clearing the buffer that feeds each device driver. Since each device is write-only, the sanitization is simply to flush and clear the buffers to avoid remnant data from being mixed with new data from the other domain. The touchscreen, microphone and keypad are examples of switched input devices which do not need sanitization.

The touchscreen, display and keypad are logically grouped together since they may all need to be switched simultaneously and immediately when the user initiates a domain switch. The microphone and speaker are logically grouped together and they may not need to immediately switch when the user initiates a domain switch. This is to avoid a secure voice conversation from switching over to the low domain should the user initiate a transition to the low domain during a secure voice call.

Data at Rest

All data, when not actively in use, whether in non-volatile Flash memory or volatile RAM may require some degree of protection. All data stored in Flash memory, whether internal or external to the phone, may be encrypted immediately prior to storage to prevent unauthorized access.

If the system high domain is in a locked state, whether through timeout or overt action by the user, the RAM associated with the high domain may be sanitized for additional protection and may need to be reinstated before the high domain can resume processing. The system low domain may also be locked, but the RAM may remain untouched.

Key Management

Keys may be stored persistently. One method may use Suite B algorithms and PKI key material. Stored key material may be AES key wrapped using a key encryption key (KEK) that is split with a user password and a random value. The split KEK may then be stored in internal Flash memory (unencrypted persistent storage). This allows for a more dynamic KEK value, but is only as strong as the user password.

Keys may also be stored temporarily in internal RAM. In the event of power loss the device needs to be externally rekeyed. Locking the device may allow the keys to remain present in RAM.

Field Control and Configuration

The phone may have security parameters that can be configured, as well as trusted controls necessary to interact with the phone in a secure manner.

Figure 17:
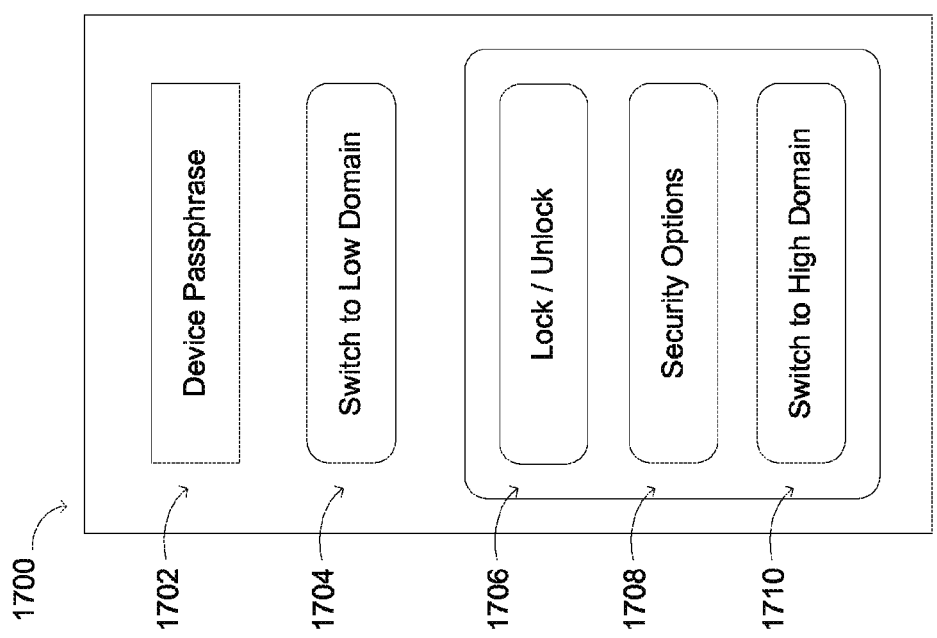
FIG. 17 illustrates an exemplary embodiment of a user interface display for access control, domain switching and security parameter configuration.
Figure 18:
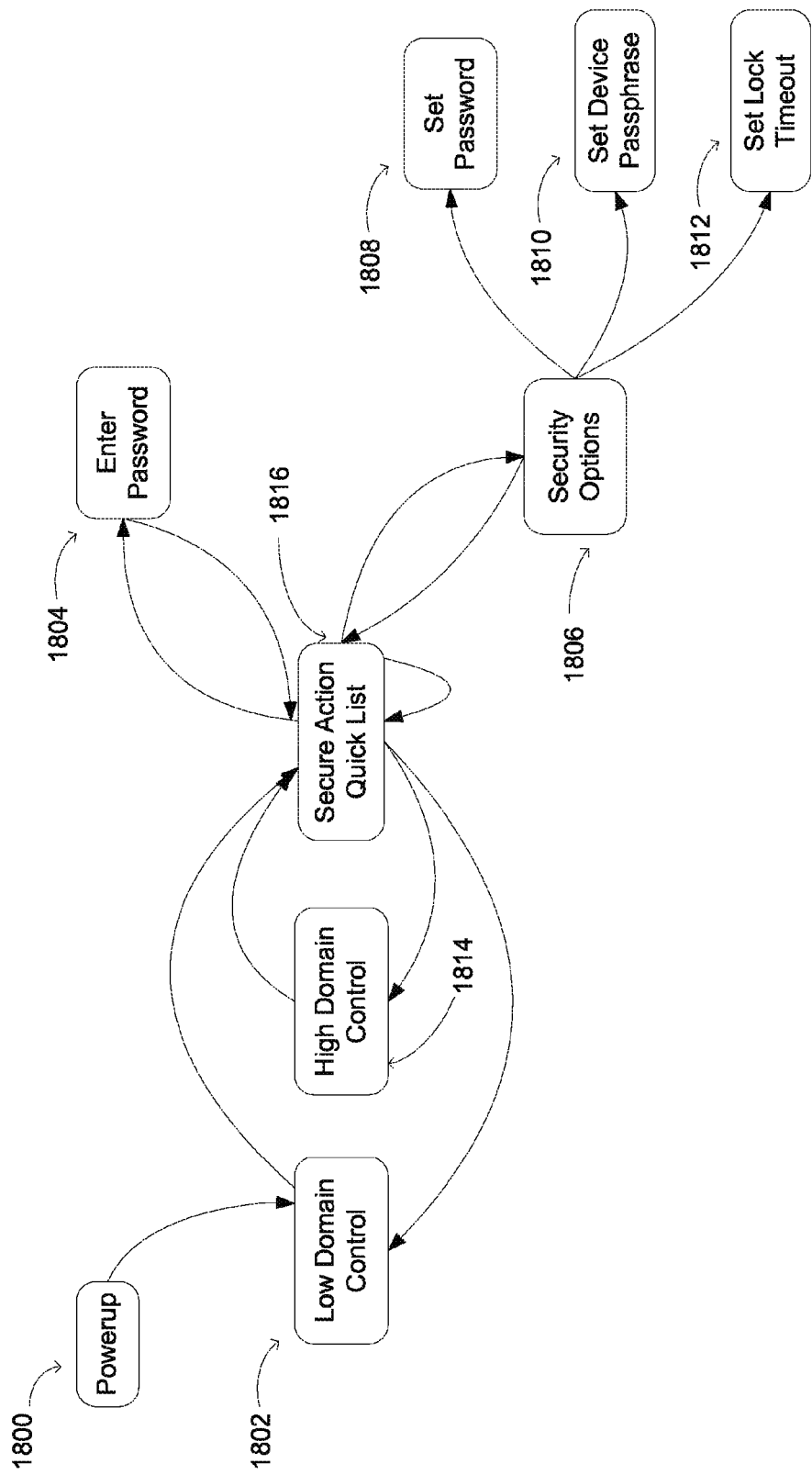
FIG. 18 illustrates a state diagram showing access control, domain switching and security parameter configuration in accordance with an embodiment of the invention.

In one embodiment of the invention, access control to the device may be provided. The access control may be a single-factor password based mechanism. Mutual authentication may be required. The procedure may be initiated by a hard-key press which is intercepted at the device driver and unseen by the OS environments. A popup dialog may be presented to the user requesting a device passphrase to authenticate the device and gain access to protected functions including setting some security options and switching to the system high domain. The passphrase may also be used to cryptographically recover stored key material. The display may appear as illustrated in FIG. 17. The popup dialog may be used to switch domains and change security parameters. FIG. 18 illustrates an example state diagram showing access control, domain switching and security parameter configuration according to some embodiments.

Both OS domains may be live and active simultaneously although isolated in RAM and Flash memory. This provides support for background synchronization. A hard-key press may be used to switch between domains. The hard key press may be captured by an input only device and processed by a trusted element at the device driver level and not forwarded to either OS. It may be undesirable to rely on an application in the high or low domain to initiate the switch since this may increase the chance of a security breach. Physical keys are preferable to virtual keys because physical key presses are discrete events that can be filtered out at the device driver level and never forwarded to the high or low domain software that may have current control over the display and keypad.

Once the user initiates a domain switch using a physical key press, the trusted device driver element notifies a trusted security element to take control of the keypad and display, which may then present the user with a two-way authentication prompt. Identity management relies on a mutual authentication scheme. The trusted element displays a device passphrase on the screen, which the user may recognize as having been previously entered, and then presents the user with a short menu of options. The display may be trusted because (1) the key press was intercepted at a low level device driver before entering either domain and (2) the display presented a shared secret device passphrase to the user which is not accessible by any software outside of the trusted domain.

Some actions may require the user to enter their password to perform the action. The action may be trusted to have been performed because the phone first authenticated itself as the trusted portion. Some actions may also be limited to only certain users who have the authentication credentials. Once authenticated, the user can switch between domains or perform security actions more quickly without entering credentials repeatedly, until either a timeout or overt lock occurs. Some rare and important security actions may require a password every time. There may also be an additional menu option for certain users to gain access to more advanced settings to which other users do not have access.

Some switched device drivers may lag or not switch. For example, it may be undesirable for the speaker and microphone to switch domains during a call in progress.

Field updates and maintenance may include software updates. Trusted portions of software may be updated under restriction controls including the requirement that the updates be signed. The system high side may benefit from signed software which has been evaluated. The system low side may benefit from compatibility with existing commercial standards such as, for example, the Android™ or Google™ marketplace.

The device may be disposed of when no longer needed or repurposed. All information in the phone can be sanitized by following the provisioning process described previously. The phone may then either be returned to the original default Android™ image, for example, or to a new secure image. In the event of accidental loss or theft, a remote sanitization capability may be provided in some embodiments.

Figure 19:
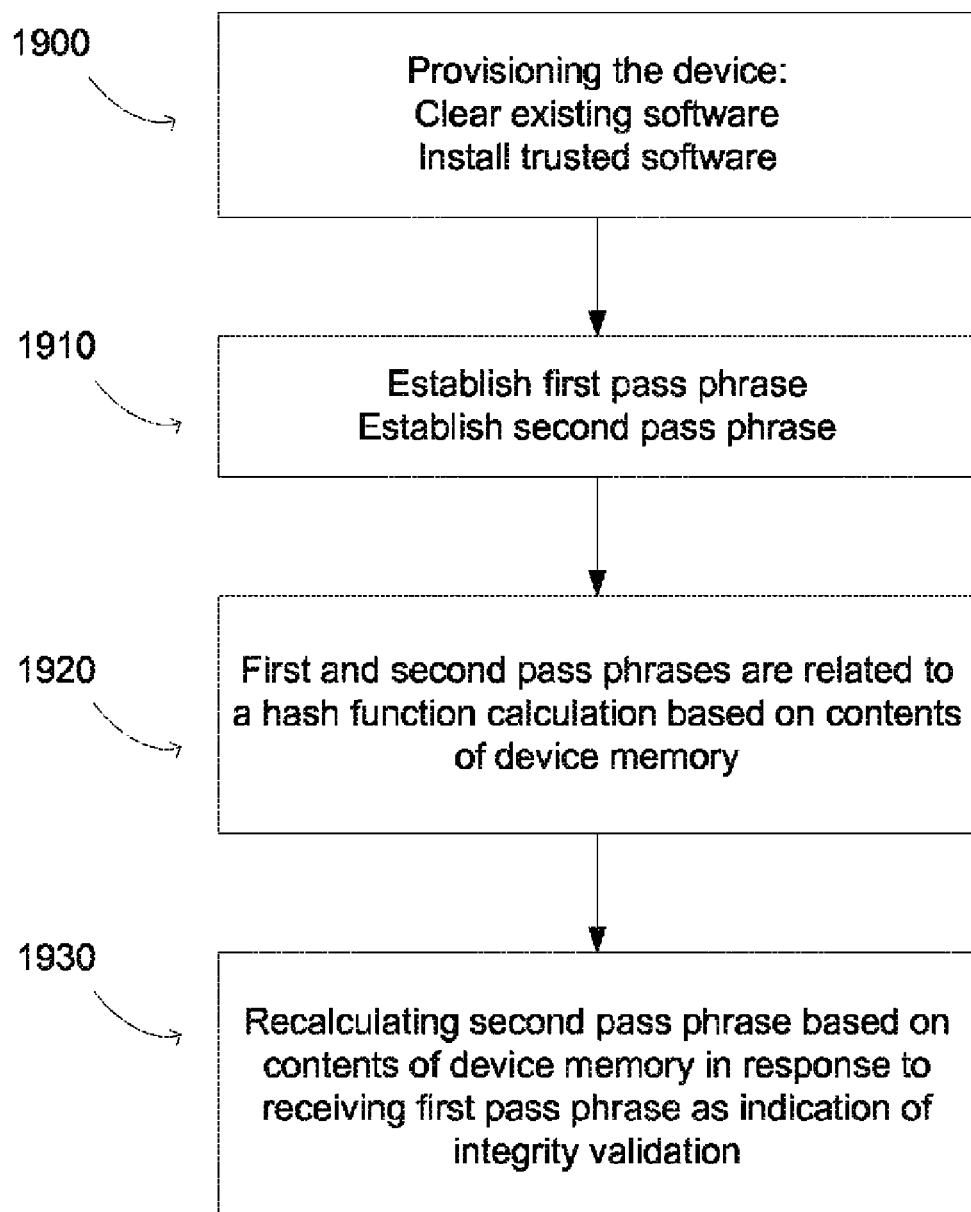
FIG. 19 illustrates a procedure for validating the integrity of a mobile communication device in accordance with some embodiments.

FIG. 19 illustrates a procedure for validating the integrity of a mobile communication device in accordance with some embodiments. Integrity validation may be performed to ensure that the device software has not been altered in an unauthorized manner or without the knowledge of the user. Operation 1900 comprises provisioning the device. In some embodiments provisioning comprises clearing existing software from the device and installing trusted software on the device. In some embodiments provisioning is performed in a location shielded from WiFi access.

Operation 1910 comprises establishing a first pass phrase and a second pass phrase. Operation 1920 comprises relating the first and second pass phrases to a hash function calculation based on the contents of device memory as follows. The first pass phrase is used as a hash seed value. A hash calculation is performed over the device memory using this seed value. The second pass phrase is split against the calculated hash result. This split is stored, while the second pass phrase is erased. Operation 1930 comprises recalculating the second pass phrase based on the contents of device memory in response to receiving the first pass phrase and displaying it as an indication of integrity validation. The user challenges the phone for verification by entering the first pass phrase and the phone responds with the second pass phrase. If the displayed second pass phrase is not the expected value, this may indicate that the device software has been altered. This handshake procedure between the first pass phrase and the second pass phrase may ensure that malware would be unable to reproduce the second pass phrase to deceptively indicate device integrity. In some embodiments a shared secret is displayed on the screen to validate integrity.

In some embodiments the second pass phrase is displayed at power up of the device as an indication of integrity validation.

Figure 20:
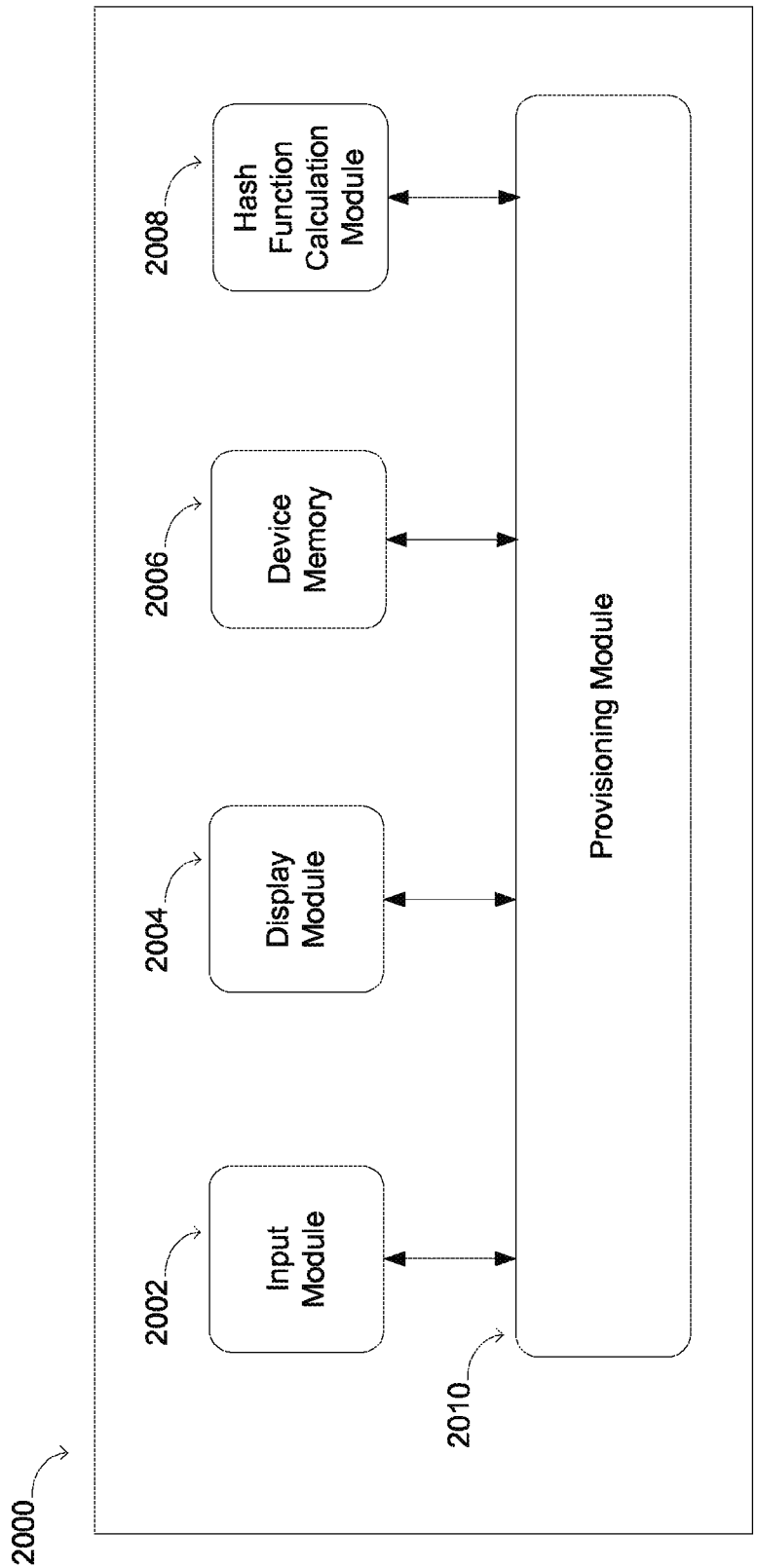
FIG. 20 illustrates a functional block diagram of a mobile communication device configured to provide integrity validation.

FIG. 20 illustrates a functional block diagram of a mobile communication device configured to provide integrity validation. The term module may comprise hardware, software or a combination of both. The device 2000 comprises a provisioning module 2010 to clear existing software from the device, install trusted software on the device and establish a first pass phrase and a second pass phrase. An input module 2002 receives the first pass phrase and a display module 2004 displays the second pass phrase as an indication of integrity validation in response to the receiving of the first pass phrase. A hash function calculation module 2008 relates the first and second passphrases based on a hash function calculation of the contents of the device memory 2006.

In some embodiments the display module displays the second pass phrase at power up of the device as an indication of integrity validation.

In some embodiments the provisioning module operates in a location shielded from WiFi access.

What is claimed is:

1. A method for validating integrity of a mobile communication device, the method comprising:
    installing an integrity verification application on the mobile communication device, wherein the integrity verification application comprises a list of expected signatures for data on the mobile communication device;
    running the integrity verification application to validate the data based on the expected signatures;
    establishing a first pass indicator and a second pass indicator, wherein establishing the first pass indicator and the second pass indicator comprises:
        receiving a first instance of the first pass indicator;
        performing a first integrity check calculation on non-volatile memory of the mobile communication device using the first instance of the first pass indicator as a seed value to provide a first integrity check value;
        receiving the second pass indicator;
        splitting a parameter of the second pass indicator against the first integrity check value to provide a split of the second pass indicator; and
        storing the split of the second pass indicator in the non-volatile memory of the mobile communication device;
    thereafter, receiving a second instance of the first pass indicator as a challenge for verification, and in response to receiving the second instance of the first pass indicator:
        performing a second integrity check calculation on the non-volatile memory of the mobile communication device using the second instance of the first pass indicator as a seed value to provide a second integrity check value, the second integrity check calculation being different from the first integrity check calculation;
        determining the second pass indicator based on the split of the second pass indicator and the second integrity check value; and
        displaying the second pass indicator as an indication of the integrity.

2. The method of claim 1, wherein the second pass indicator is displayed in response to receiving the second instance of the first pass indicator during operation or at power up of the mobile communication device.

3. The method of claim 1, further comprising:
    provisioning the mobile communication device by deleting existing software from the mobile communication device and installing trusted software on the mobile communication device.

4. The method of claim 3, wherein the provisioning is performed in a location that is shielded from WiFi or other remote or local access other than the provisioning.

5. The method of claim 1, wherein the list of expected signatures comprises binary executables.

6. The method of claim 1, wherein establishing the first pass indicator and the second pass indicator further comprises:
    receiving a private certificate and a public certificate;
    encrypting the public certificate to provide an encrypted public certificate;
    storing the encrypted public certificate in the non-volatile memory of the mobile communication device; and
    encrypting the split of the second pass indicator using the private certificate before storing the split of the second pass indicator in the non-volatile memory of the mobile communication device;
    and wherein determining the second pass indicator based on the split of the second pass indicator and the second integrity check value comprises:
        decrypting the encrypted public certificate; and
        decrypting the split of the second pass indicator using the public certificate.

7. The method of claim 1, wherein the first integrity check value and the second integrity check value include at least one of a hash or a digital signature.

8. The method of claim 1, wherein at least one of the first pass indicator or the second pass indicator include a text-based key phrase.

9. A mobile communication device comprising:
    a first integrity verification application comprising a list of expected signatures for data on the mobile communication device;
    an initialization module configured to establish a first pass indicator and a second pass indicator, the initialization module comprising:
        an input module configured to receive the first pass indicator and the second pass indicator;
        a first integrity check calculation module configured to calculate a first integrity check on non-volatile memory of the mobile communication device using the first pass indicator as a seed value to provide a first integrity check value;
        a splitting module configured to split a parameter of the second pass indicator against the first integrity check value to provide a split of the second pass indicator; and
        a storing module configured to store the split of the second pass indicator in the non-volatile memory of the mobile communication device;
    a second integrity verification module configured to receive the first pass indicator as a challenge for verification, the second integrity verification module comprising:
        a second integrity check calculation module configured to calculate a second integrity check on the non-volatile memory of the mobile communication device using the first pass indicator as a seed value to provide a second integrity check value;
        a determining module configured to determine the second pass indicator based on the split of the second pass indicator and the second integrity check value; and
        a display module configured to display the second pass indicator as an indication of integrity.

10. The mobile communication device of claim 9, further comprising a provisioning module configured to provision the mobile communication device by deleting existing software from the mobile communication device and installing trusted software on the mobile communication device.

11. The mobile communication device of claim 10, wherein the provisioning module operates in a location that is shielded from WiFi or other remote or local access other than provisioning.

12. The mobile communication device of claim 9, wherein the list of expected signatures comprises binary executables.

13. The mobile communication device of claim 9, further comprising:
   a second input module configured to receive a private certificate and a public certificate;
   a first encrypting module configured to encrypt the public certificate to provide an encrypted public certificate;
   a second storing module configured to store the encrypted public certificate in the non-volatile memory of the mobile communication device;
   a second encrypting module configured to encrypt the split of the second pass indicator using the private certificate before storing the split of the second pass indicator in the non-volatile memory of the mobile communication device;
   a first decrypting module configured to decrypt the encrypted public certificate; and
   a second decrypting module configured to decrypt the split of the second pass indicator using the public certificate.

14. The mobile communication device of claim 9, wherein the first integrity check value and the second integrity check value include at least one of a hash or a digital signature.

15. The mobile communication device of claim 9, wherein at least one of the first pass indicator or the second pass indicator include a text-based key phrase.

16. A method for validating a mobile communication device, the method comprising:
   installing an integrity verification application on the mobile communication device, wherein the integrity verification application comprises a list of expected signatures for data on the mobile communication device;
   establishing a first pass indicator and a second pass indicator, wherein establishing the first pass indicator and the second pass indicator comprises:
   receiving the first pass indicator;
   performing a first integrity check calculation on non-volatile memory of the mobile communication device using the first pass indicator as a seed value to provide a first integrity check value;
   receiving the second pass indicator;
   splitting a parameter of the second pass indicator against the first integrity check value to provide a split of the second pass indicator; and
   storing the split of the second pass indicator in the non-volatile memory of the mobile communication device
   receiving a second instance of the first pass indicator as a challenge for verification, in response to receiving the second instance of the first pass indicator:
   performing a second integrity check calculation on the non-volatile memory of the mobile communication device to provide a second integrity check value,
   the second integrity check calculation being different from the first integrity check calculation;
   determining the second pass indicator based on the split of the second pass indicator and the second integrity check value; and
   displaying the second pass indicator as an indication of integrity.

17. The method of claim 16, wherein establishing the first pass indicator and the second pass indicator further comprises:
   generating a private certificate and a public certificate;
   encrypting the public certificate to provide an encrypted public certificate;
   storing the encrypted public certificate in the non-volatile memory of the mobile communication device; and
   encrypting the split of the second pass indicator using the private certificate before storing the split of the second pass indicator in the non-volatile memory of the mobile communication device.

18. The method of claim 16, wherein the first integrity check value and the second integrity check value include at least one of a hash or a digital signature.

19. The method of claim 16, wherein at least one of the first pass indicator or the second pass indicator include a text-based key phrase.

* * * * *